United States Patent
Takahashi et al.

(10) Patent No.: US 10,333,166 B2
(45) Date of Patent: Jun. 25, 2019

(54) ELECTRODE CATALYST FOR FUEL CELL, METHOD FOR PRODUCING THE SAME, ELECTRODE CATALYST LAYER FOR FUEL CELL COMPRISING THE CATALYST, AND MEMBRANE ELECTRODE ASSEMBLY FOR FUEL CELL AND FUEL CELL USING THE CATALYST OR THE CATALYST LAYER

(71) Applicants: NISSAN MOTOR CO., LTD., Yokohama-shi, Kanagawa (JP); NIPPON STEEL CHEMICAL & MATERIAL CO., LTD., Chiyoda-ku, Tokyo (JP)

(72) Inventors: Shinichi Takahashi, Kanagawa (JP); Tetsuya Mashio, Kanagawa (JP)

(73) Assignees: NISSAN MOTOR CO., LTD., Yokohama-shi (JP); NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 95 days.

(21) Appl. No.: 15/521,681

(22) PCT Filed: Oct. 8, 2015

(86) PCT No.: PCT/JP2015/078617
§ 371 (c)(1),
(2) Date: Apr. 25, 2017

(87) PCT Pub. No.: WO2016/067881
PCT Pub. Date: May 6, 2016

(65) Prior Publication Data
US 2017/0250432 A1 Aug. 31, 2017

(30) Foreign Application Priority Data
Oct. 29, 2014 (JP) .................................. 2014-220579

(51) Int. Cl.
*H01M 8/1018* (2016.01)
*H01M 4/92* (2006.01)
(Continued)

(52) U.S. Cl.
CPC .......... *H01M 8/1018* (2013.01); *H01M 4/86* (2013.01); *H01M 4/8668* (2013.01); *H01M 4/88* (2013.01);
(Continued)

(58) Field of Classification Search
None
See application file for complete search history.

(56) References Cited

U.S. PATENT DOCUMENTS

| 5,869,922 A | 2/1999 | Tolt |
| 10,135,074 B2 | 11/2018 | Takahashi et al. |

(Continued)

FOREIGN PATENT DOCUMENTS

| JP | 2003-109614 A | 4/2003 |
| JP | 2004-149399 A | 5/2004 |

(Continued)

OTHER PUBLICATIONS

Childres Isaac Childres, Luis A. Jauregui, Wonjun Park, Helin Cao and Yong P. Chen, "Raman Spectroscopy of Graphene and Related Materials," "New Developments in Photon and Materials Research," ed. J.I. Jang, Nova Science Publishers (Jul. 2013). (Year: 2013).*

(Continued)

*Primary Examiner* — Rena Dye Cronin
(74) *Attorney, Agent, or Firm* — Foley & Lardner LLP

(57) ABSTRACT

Provided is a catalyst for fuel cell which has a high catalytic activity and enables maintaining the high catalytic activity. Disclosed is an electrode catalyst for fuel cell comprising a catalyst carrier containing carbon as a main component and a catalytic metal supported on the catalyst carrier, wherein (Continued)

the catalyst has the R' (D'/G intensity ratio) of 0.6 or less, which is the ratio of D' band peak intensity (D' intensity) measured in the vicinity of 1620 cm$^{-1}$ relative to G band peak intensity (G intensity) measured in the vicinity of 1580 cm$^{-1}$ by Raman spectroscopy, and the volume ratio of a water vapor adsorption amount relative to a nitrogen adsorption amount at a relative pressure of 0.5 in adsorption isotherm is 0.15 or more and 0.30 or less.

16 Claims, 2 Drawing Sheets

(51) Int. Cl.
 *H01M 4/88* (2006.01)
 *H01M 4/86* (2006.01)
 *H01M 8/1004* (2016.01)

(52) U.S. Cl.
 CPC ........... *H01M 4/8803* (2013.01); *H01M 4/92* (2013.01); *H01M 4/926* (2013.01); *H01M 8/1004* (2013.01); *H01M 4/8828* (2013.01); *H01M 2008/1095* (2013.01); *H01M 2300/0082* (2013.01); *Y02P 70/56* (2015.11)

(56) References Cited

U.S. PATENT DOCUMENTS

| | | | |
|---|---|---|---|
| 2003/0179537 A1 | 9/2003 | Tanaka et al. | |
| 2004/0121220 A1 | 6/2004 | Ikoma | |
| 2007/0211411 A1 | 9/2007 | Tanaka et al. | |
| 2008/0032181 A1* | 2/2008 | Yamamoto | H01M 4/8605 429/480 |
| 2009/0233135 A1 | 9/2009 | Horiuchi et al. | |
| 2010/0075835 A1 | 3/2010 | Yuge et al. | |
| 2010/0304266 A1* | 12/2010 | Periyasamy | C09K 3/1028 429/483 |
| 2011/0014111 A1 | 1/2011 | Leugers et al. | |
| 2011/0045347 A1 | 2/2011 | Liu et al. | |
| 2011/0058308 A1 | 3/2011 | Nishi et al. | |
| 2011/0182001 A1 | 7/2011 | Tanaka et al. | |
| 2011/0287336 A1 | 11/2011 | Himeno et al. | |
| 2011/0318254 A1 | 12/2011 | Morishita | |
| 2012/0094207 A1* | 4/2012 | Wakizaka | H01M 4/9016 429/482 |
| 2013/0288155 A1* | 10/2013 | Kim | H01M 4/926 429/483 |
| 2014/0091033 A1* | 4/2014 | Kitano | H01M 4/625 210/505 |
| 2014/0170528 A1 | 6/2014 | Monden et al. | |
| 2014/0255803 A1 | 9/2014 | Ng et al. | |
| 2015/0030966 A1 | 1/2015 | Shimoi et al. | |
| 2015/0104372 A1 | 4/2015 | Lin et al. | |
| 2015/0240707 A1 | 8/2015 | Wang et al. | |
| 2016/0233520 A1* | 8/2016 | Takahashi | B01J 21/18 |

FOREIGN PATENT DOCUMENTS

| | | |
|---|---|---|
| JP | 2005-026174 A | 1/2005 |
| JP | 2008-105922 A | 5/2008 |
| JP | 2008-153694 A | 7/2008 |
| WO | WO-2007/055411 A1 | 5/2007 |
| WO | WO-2013/129417 A1 | 9/2013 |
| WO | WO-2014/123213 A1 | 8/2014 |
| WO | WO-2014/129597 A1 | 8/2014 |

OTHER PUBLICATIONS

European Extended Search Report, dated Oct. 13, 2017, 11 pages.
Liu et al., "Graphene supported platinum nanoparticles as anode electrocatalyst for direct borohydride fuel cell," International Journal of Hydrogen Energy, 2012, 8 pages.
A. Sadezky et al., Raman Microspectroscopy of Soot and Related Carbonaceous Materials: Spectral Analysis and Structural Information, Carbon 43, 2005, pp. 1731-1742 and Supplementary data associated with the article (Tables S1-S3).
European Office Action, Application No. 14 848 927.1, dated May 17, 2017, 4 pages.
Mitsuyoshi Muraoka et al., Iron Addition to Vietnam Anthracite Coal and its Nitrogen Doping as a PEFC Non-Platinum Cathode Catalyst, Fuel, May 29, 2012, vol. 102, pp. 359-365.

* cited by examiner

[Figure 1]
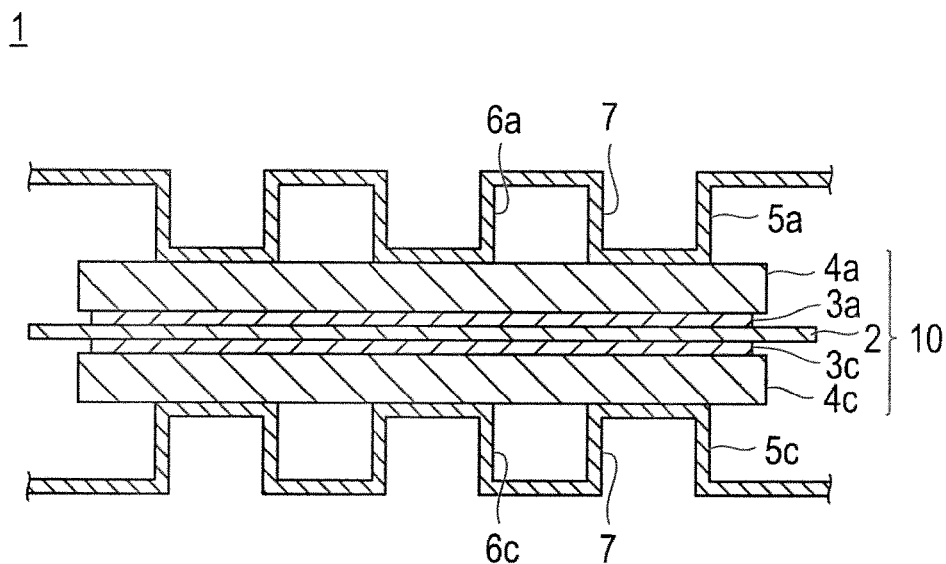
[Figure 2]
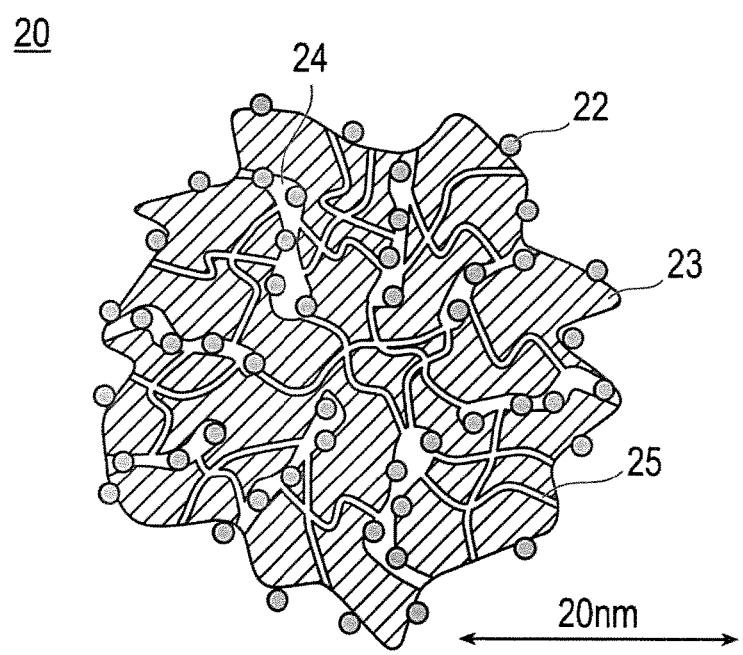

[Figure 3]
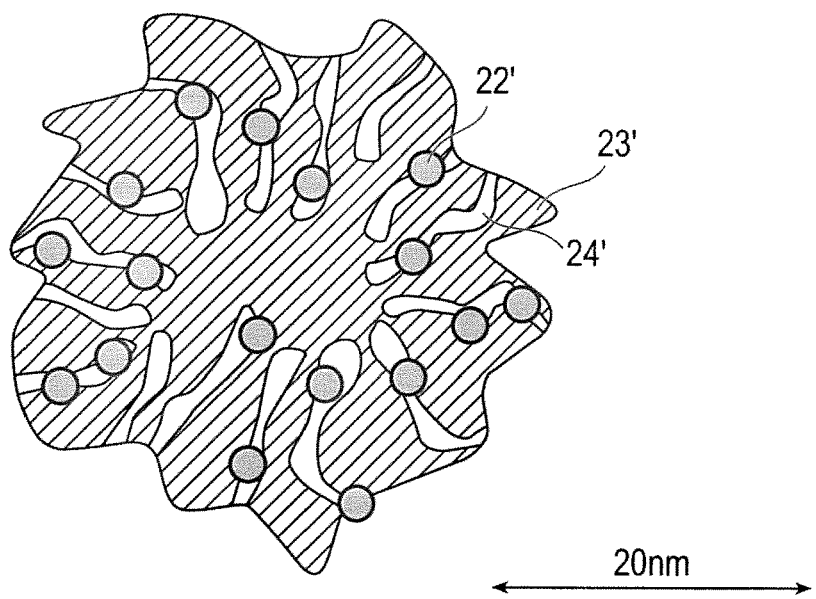
[Figure 4]
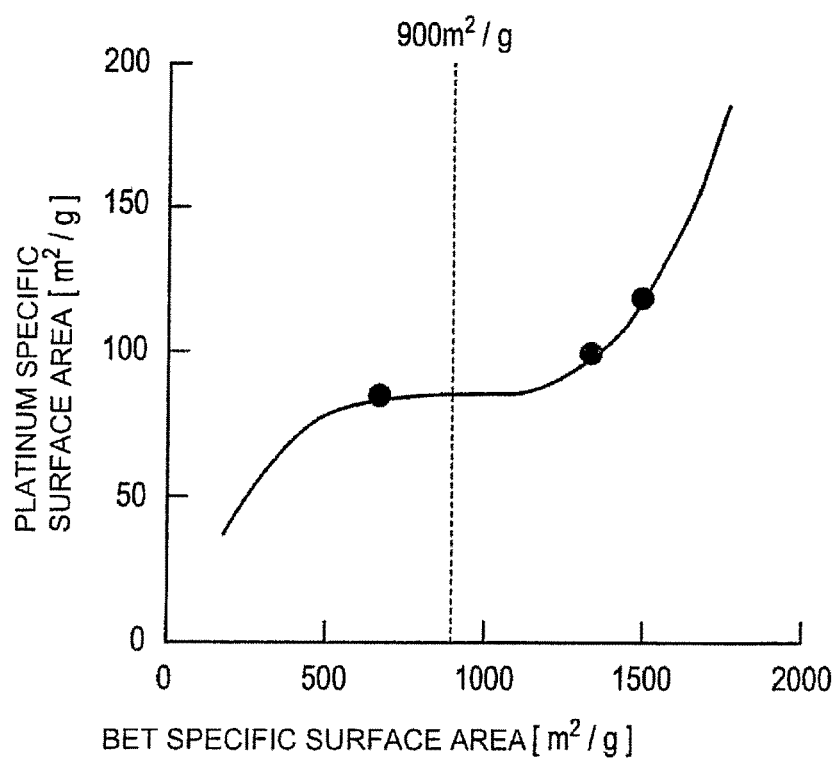

ELECTRODE CATALYST FOR FUEL CELL, METHOD FOR PRODUCING THE SAME, ELECTRODE CATALYST LAYER FOR FUEL CELL COMPRISING THE CATALYST, AND MEMBRANE ELECTRODE ASSEMBLY FOR FUEL CELL AND FUEL CELL USING THE CATALYST OR THE CATALYST LAYER

TECHNICAL FIELD

The present invention relates to an electrode catalyst for fuel cell, method for producing the same, electrode catalyst layer for fuel cell comprising the catalyst, and membrane electrode assembly for fuel cell and fuel cell using the catalyst or the catalyst layer.

BACKGROUND ART

A polymer electrolyte fuel cell (PEFC) using a proton-conductive solid polymer membrane operates at lower temperature compared to other types of a fuel cell such as a solid oxide fuel cell or a molten carbonate fuel cell, for example. For such reasons, the polymer electrolyte fuel cell is expected to be used as a stationary power supply or a power source for a moving object such as an automobile, and actual application thereof has been already started.

For the polymer electrolyte fuel cell, an expensive metal catalyst represented by Pt (platinum) or Pt alloy is generally used. Furthermore, as a carrier for supporting the metal catalyst, graphitized carbon is used from the viewpoint of water repellency and corrosion resistance. It is described in JP 2005-26174 A to use a carrier in which average lattice plant spacing of a [002] plane, that is, d002, is 0.338 to 0.355 nm, specific surface area is 80 to 250 m$^2$/g, and volume density is 0.30 to 0.45 g/ml. In JP 2005-26174 A, it is described that the durability of a cell is improved by using the graphitized carbon.

SUMMARY OF INVENTION

However, although the catalyst using the carrier described in JP 2005-26174 A has high durability, it has a problem that, as an electrolyte is in contact with catalytic metal particles and a transport path of the reaction gas (in particular, $O_2$) to a catalytic metal is blocked, the catalytic activity is lowered.

An object of the present invention is to provide an electrode catalyst which has high durability and an excellent gas transportability, an electrode catalyst layer, and a method for producing the same.

Another object of the present invention is to provide an electrode catalyst which has an excellent catalytic activity, an electrode catalyst layer, and a method for producing the same.

Still another object of the present invention is to provide a membrane electrode assembly and a fuel cell which have an excellent power generation performance.

Means for Solving Problems

The inventors of the present invention conducted intensive studies to solve the problems mentioned above. As a result, they found that the problems can be solved if a catalyst with a specific D'/G intensity ratio in which the ratio of a water vapor adsorption amount compared to a nitrogen adsorption amount is within a specific range is used. The present invention is completed accordingly.

BRIEF DESCRIPTION OF DRAWING

FIG. 1 is a schematic cross-sectional view illustrating the basic configuration of a polymer electrolyte fuel cell according to an embodiment of the present invention. In FIG. 1, 1 denotes a polymer electrolyte fuel cell (PEFC), 2 denotes a solid polymer electrolyte membrane, 3 denotes a catalyst layer, 3a denotes an anode catalyst layer, 3c denotes cathode catalyst layer, 4a denotes an anode gas diffusion layer, 4c denotes a cathode gas diffusion layer, 5 denotes a separator, 5a denotes an anode separator, 5c denotes a cathode separator, 6a denotes an anode gas passage, 6c denotes a cathode gas passage, 7 denotes a refrigerant passage, and 10 denotes a membrane electrode assembly (MEA).

FIG. 2 is a schematic explanatory cross-sectional view illustrating the shape and structure of catalysts (a) and (c) according to an embodiment of the present invention. In FIG. 2, 20 denotes a catalyst, 22 denotes a catalytic metal, 23 denotes a carrier (catalyst carrier), 24 denotes a mesopore, and 25 denotes a micropore.

FIG. 3 is a schematic explanatory cross-sectional view illustrating the shape and structure of a catalyst (b) according to an embodiment of the present invention. In FIG. 3, 20' denotes a catalyst, 22' denotes a catalytic metal, 23' denotes carrier (catalyst carrier) and 24' denotes a mesopore.

FIG. 4 is a graph illustrating the result of evaluation of platinum coating on carriers B and C which was prepared in Reference Examples 2 and 3 and carrier F which was prepared in Reference Example 6 of Experiment 1.

DESCRIPTION OF EMBODIMENTS

An embodiment of the present invention is an electrode catalyst for fuel cell containing a catalyst carrier having carbon as a main component (it is also simply referred to as a "catalyst carrier" or "carrier" in the present specification), and a catalytic metal supported on the catalyst carrier, in which the catalyst has the R' (D'/G intensity ratio) of 0.6 or less, which is the ratio of D' band peak intensity (D' intensity) measured in the vicinity of 1620 cm$^{-1}$ relative to G band peak intensity (G intensity) measured in the vicinity of 1580 cm$^{-1}$ by Raman spectroscopy, and the volume ratio of a water vapor adsorption amount compared to a nitrogen adsorption amount at a relative pressure of 0.5 in adsorption isotherm is 0.15 or more and 0.30 or less.

Another embodiment of the present invention is an electrode catalyst layer for fuel cell (in the present specification, it is also simply referred to as a "catalyst carrier" or a "carrier") including the catalyst for fuel cell of the above embodiment, and a polymer electrolyte (it is also simply referred to as an "electrolyte" in the present specification).

Namely, the catalyst of this embodiment satisfies the following constitutions (I) and (II):

(I) The volume ratio of a water vapor adsorption amount compared to a nitrogen adsorption amount is 0.15 or more and 0.30 or less.

(II) R' (D'/G intensity ratio), which is the ratio of D' band peak intensity (D' intensity) measured in the vicinity of 1620 cm$^{-1}$ relative to G band peak intensity (G intensity) measured in the vicinity of 1580 cm$^{-1}$ by Raman spectroscopy, is 0.6 or less.

Meanwhile, as described herein, the G band measured in the vicinity of 1580 cm−1 by Raman spectroscopy is also simply referred to as "G band." As described herein, the D' band measured in the vicinity of 1620 cm$^{-1}$ by Raman spectroscopy is also simply referred to as "D' band." Furthermore, each peak intensity of the G band and D' band is also referred to as "G intensity" and "D' intensity", respectively. Furthermore, the ratio of D' intensity relative to G intensity is also simply referred to as "R' value" or "D'/G intensity ratio."

Herein, the G band is a peak derived from graphite which is measured in the vicinity of 1580 cm$^{-1}$ (vibration inside hexagonal lattice of a carbon atom) by Raman scattering analysis. Furthermore, D' band is observed in the vicinity of 1620 cm$^{-1}$ as a shoulder of G band by Raman scattering analysis. The D' band is derived from a disorder or a defect of a graphite structure, and it is present when the crystal size of graphite is small or many edges are present on a graphene sheet. Unlike the center part of a graphene molecule (6-membered ring), the electron state at edge (end part) of a graphene molecule easily becomes a start point of carbon corrosion. In other words, small R' value means that the edge amount is small in carbon (graphene), which is a start point of electrochemical corrosion as present in a graphite structure. Accordingly, the durability can be improved by the above (II) so that a decrease in catalytic activity can be effectively suppressed and prevented.

Meanwhile, G band, D' band, and D band which is described below, and their peak intensity are well known in the related field. For example, reference can be made to R. Vidano and D. B Fischbach, J. Am. Ceram. Soc. 61 (1978) 13-17 or G. Katagiri, H. Ishida and A. Ishitani, Carbon 26 (1988) 565-571.

Meanwhile, when R' value is lowered by graphitization of carbon for the purpose of improving durability, the catalyst carrier turns out to have a hydrophobic property. As such, if a polymer electrolyte having a hydrophobic structure in a main chain, for example, fluorine-based polymer electrolyte or the like, is used, the polymer electrolyte can easily adsorb onto a carrier on which the catalytic metal is supported. Since the electrolyte can more easily adsorb onto a surface of a catalytic metal compared to gas such as oxygen, when such carrier is used, a surface of the catalyst or an opening (entrance) of a pore is coated at high ratio by an electrolyte. As a result, the gas transportability within a catalyst layer is lowered, and thus a decrease in catalytic activity and a decrease in power generation performance are yielded. In order to obtain a sufficient power generation performance, an expensive metal such as platinum needs to be used in a large amount, and it leads to high production cost of a fuel cell.

On the other hand, the catalyst of this embodiment satisfies the above (I). The nitrogen adsorption amount is an indicator of a specific surface area of a catalyst and the water vapor adsorption amount is an indicator of a specific surface area with a hydrophilic property of a catalyst. Thus, it can be said that the higher ratio of a water vapor adsorption amount compared to a nitrogen adsorption amount represents high hydrophillicity of a catalyst. In this connection, since a contact between the catalytic metal and electrolyte can be suppressed by controlling the hydrophillicity of a catalyst, it is believed that the reaction gas (in particular, $O_2$) can be directly supplied without mediated by an electrolyte to improve the gas transportability. The inventors of the present invention found that, even when the catalytic metal is not in contact with an electrolyte, the catalyst can be effectively utilized according to forming of a three-phase interface with water. For such reasons, as apart of the catalyst is coated with an electrolyte (only a part of the electrolyte is in contact with a catalytic metal), sites not requiring pass-through of an electrolyte increase, and thus the gas transportability can be improved. Accordingly, the reaction gas (in particular, $O_2$) can be transported more rapidly and also more efficiently to the catalytic metal so that the catalyst can exhibit a high catalytic activity, that is, the catalytic reaction can be promoted. This effect can be also effectively exhibited under conditions with a high load. Thus, a membrane electrode assembly and a fuel cell having the catalyst of this embodiment or the catalyst layer exhibit a high current and voltage (iV) property (voltage drop at high current density is suppressed), and they have an excellent power generation performance.

Meanwhile, the above mechanism is just an assumption, and the present invention is not limited to such assumption.

Furthermore, the catalyst of this embodiment preferably satisfies the following constitution (III);

(III) BET specific surface area is at least 900 m$^2$/g catalyst.

With the above (III), the catalyst can have a sufficient specific surface area, and thus the electric double layer capacity is high. As such, according to this catalyst, the dispersibility of the catalyst is improved so that an area for electrochemical reaction can be increased. In other words, the power generation performance can be improved. Meanwhile, when the BET specific surface area is 900 m$^2$/g or more, the catalyst carrier has many pores, in particular, mesopores that are described below. Accordingly, as the entrance of the pores is clogged by a polymer electrolyte, the gas transportability into the pores is impaired. Since the catalytic metal is supported in the pores, when the gas transportability into the pores is impaired, the catalytic activity is lowered. Meanwhile, according to this embodiment, the coating rate of a polymer electrolyte by a catalyst is low due to the above (I) so that clogging of pore entrance by a polymer electrolyte can be suppressed, and thus efficient transport of gas into pores can be achieved.

According to the above embodiment, a transport path of gas is ensured by controlling the amount of a catalytic metal in a suitable range to which reaction gas can reach without passing through an electrolyte. As such, the electrode catalyst layer can have an improved gas transportability, and also an excellent catalytic activity. Furthermore, according to the present invention, as the catalyst has low R' value, the electrode catalyst layer has high durability so that a high catalytic activity is maintained.

Thus, by having an improved gas transportability, the fuel cell catalyst for fuel cell of this embodiment, and the catalyst layer for fuel cell using this can exhibit a high catalytic activity, and also can maintain the activity. In addition, a membrane electrode assembly and a fuel cell having this catalyst or this catalyst layer have excellent power generation performance and durability. As such, another embodiment of the present invention is a fuel cell membrane electrode assembly which includes the aforementioned fuel cell electrode catalyst or fuel cell electrode catalyst layer. Still another embodiment of the present invention is a fuel cell which includes the fuel cell membrane electrode assembly.

Hereinbelow, one embodiment of the catalyst of the present invention and one embodiment of a catalyst layer, a membrane electrode assembly (MEA), and a fuel cell using the catalyst are described in detail with suitable reference to the drawings. However, the present invention is not limited to the following embodiments. Meanwhile, each drawing is exaggerated for the convenience of description, and the dimensional ratio of each constitutional element can be different from actual ratios. Furthermore, when descriptions of the embodiment of the present invention are given in view of the drawings, the same elements are given with the same symbols for describing the drawings, and overlapped descriptions are omitted.

Furthermore, as described herein, "X to Y" for representing a range means "X or more and Y or less." Furthermore, unless specifically described otherwise, operations and measurements of physical properties or the like are performed at room temperature (20 to 25° C.)/relative humidity of 40 to 50%.

[Fuel Cell]

A fuel cell has a membrane electrode assembly (MEA) and a pair of separator having an anode-side separator having a fuel gas passage for flowing fuel and a cathode-side separator having an oxidant gas passage for flowing an oxidant. The fuel cell according to this embodiment has excellent durability and it can exhibit very high power generation performance.

FIG. 1 is a schematic cross-sectional view illustrating the basic configuration of a polymer electrolyte fuel cell (PEFC) 1 according to an embodiment of the present invention. PEFC 1 has a solid polymer electrolyte membrane 2, and a pair of catalyst layers (anode catalyst layer 3a and cathode catalyst layer 3c) to sandwich the solid polymer electrolyte membrane 2. A laminated body constituted by the solid polymer electrolyte membrane 2 and the catalyst layers (3a and 3c) is sandwiched by a pair of gas diffusion layers (GDL) (anode gas diffusion layer 4a and cathode gas diffusion layer 4c). Thus, the solid polymer electrolyte membrane 2, the pair of the catalyst layers (3a and 3c) and the pair of the gas diffusion layers (4a and 4c) are stacked to constitute a membrane electrode assembly (MEA) 10.

In the PEFC 1, the MEA 10 is further sandwiched by a pair of separators (anode separator 5a and cathode separator 5c). In FIG. 1, the separators (5a and 5c) are shown as being located on both ends of the illustrated MEA 10. However, in a fuel cell stack in which a plurality of MEAs is stacked up, the separators are also generally used as the separators for the adjacent PEFC (not shown). In other words, the MEAs form a stack by sequentially laminated via the separators in a fuel cell stack. In other words, a fuel cell stack is constituted in such a manner that the MEAs are sequentially stacked via a separator to form a stack. Meanwhile, in an actual fuel cell stack, gas seal members are provided between the separator (5a and 5c) and the solid polymer electrolyte membrane 2, or between the PEFC 1 and the adjacent other PEFC. However, they are not illustrated in FIG. 1.

The separators (5a and 5c) are obtained by, for example, applying a press forming process to thin plates with a thickness of 0.5 mm or less, forming a corrugating shape as shown in FIG. 1. The convex areas of the separators (5a and 5c) seen from the MEA side are in contact with the MEA 10. Therefore, an electrical connection with the MEA 10 is surely obtained. Furthermore, the concave areas as viewed from the MEA of the separator (5a and 5c) (spaces between the separator and the MEA derived from the concave-convex shape of the separator) function as a gas passage through which gas flows at the time of the operation of the PEFC 1. Specifically, a fuel gas (for example, hydrogen or the like) flows in gas passage 6a of the anode separator 5a, and an oxidant gas (for example, air or the like) flows in gas passages 6c of the cathode separator 5c.

Meanwhile, the concave areas as viewed from the opposite side of the MEA of the separator (5a and 5c) become a refrigerant passage 7 through which a refrigerant (for example, water) flows to cool the PEFC at the time of the operation of the PEFC 1. Furthermore, the separator is generally provided with a manifold (not shown). The manifold functions as a connection means for connecting each cell when constituting a stack. By having such a constitution, mechanical strength of the fuel cell stack can be obtained.

Meanwhile, according to the embodiment illustrated in FIG. 1, the separator (5a and 5c) is formed to have a concave-convex shape. However, the separator is not limited to have such concave-convex shape, and as long as it can exhibit the function as a gas passage and a refrigerant passage, it can have any shape such as flat shape or a partial concave-convex shape.

The fuel cell having MEA of the present invention as described above exhibits an excellent power generation performance and excellent durability. Herein, a type of the fuel cell is not particularly limited. Although descriptions are given above by having a polymer electrolyte fuel cell as an example, other examples include an alkali fuel cell, a direct methanol fuel cell, and a micro fuel cell. Among them, as having a small size and high density and high output, a polymer electrolyte fuel cell (PEFC) can be preferably mentioned. Furthermore, the aforementioned fuel cell is also useful as a stationary power supply in addition to a power source for a moving object such as an automobile which has limited loading space. It is particularly preferably used as a power source for a moving object such as an automobile where high output voltage is required after stopping operation for a relatively long time.

A type of fuel gas used at the time of the operation of the fuel cell is not particularly limited. Examples of the fuel gas include hydrogen, methanol, ethanol, 1-propanol, 2-propanol, 1-butanol, secondary butanol, tertiary butanol, dimethyl ether, diethyl ether, ethylene glycol and diethylene glycol. Particularly, hydrogen and methanol are preferably used in terms of having a high output property.

Furthermore, the use for which the fuel cell can be applied is not particularly limited, but it is suitably applied to a motor vehicle. The electrolyte membrane-electrode assembly of the present invention has an excellent power generation performance and excellent durability and it allows obtainment of a cell with small size. For such reasons, the fuel cell of the present invention is particularly advantageous when it is applied to a motor vehicle from the viewpoint of installing it on a vehicle. Accordingly, the present invention provides a motor vehicle having the fuel cell of the present invention.

Hereinbelow, the members constituting the fuel cell of the present invention are briefly described, but the technical scope of the present invention is not limited to the following embodiments.

[Electrode Catalyst Layer (Catalyst Layer)]

The electrode catalyst layer (catalyst layer) of the present embodiment may be either a cathode catalyst layer or an anode catalyst layer, but is preferably a cathode catalyst layer. As described above, in the catalyst layer of the present embodiment, a catalyst can be effectively used by forming three-phase interfaces with water even when the catalyst and the electrolyte are not in contact with each other, because water is formed in the cathode catalyst layer.

As described herein, the catalyst layer essentially contains a catalyst, in which a catalytic metal is supported on the catalyst carrier, and an electrolyte.

(Catalyst)

(II) R' (D'/G intensity ratio) which is a ratio of D' intensity relative to G intensity of the catalyst is 0.6 or less.

According to the above (II), the amount of the edge of carbon (graphene) which becomes a start point of electrochemical corrosion in the graphite structure of the catalyst carrier can be kept at sufficiently low level. Accordingly, the durability can be improved and a reduction in the catalytic activity when supported with a catalytic metal can be effectively suppressed and prevented. From the viewpoint of further improvement of durability, the R' value (D'/G intensity ratio) of the catalyst is preferably 0 to 0.6, and more preferably 0 to 0.51.

In addition to above, the catalyst preferably has (II') R (D/G intensity ratio) of 1.7 or more, which is a ratio of D intensity relative to G intensity. Meanwhile, the D band measured around 1360 cm-1 by Raman spectroscopy is also herein simply referred to as "D band". Furthermore, peak intensity of D band is also referred to as "D intensity." Furthermore, the ratio of the D intensity relative to the G intensity is simply referred to as "R value" or "D/G intensity ratio." Herein, D band is observed around 1360 cm-1 by Raman scattering analysis, and it results from a disorder or a defect in a graphite structure. It appears when orientation property of graphene molecule is high or graphitization level is high. In other words, a high R value means low graphitization level of carbon powder (carrier). For such reasons, when R value is 1.7 or more, electric double layer capacity per surface area of carbon powder becomes larger, and thus the catalytic activity can be more effectively improved. Considering a further improvement of the electric double layer capacity (catalytic activity), the R value (D/G intensity ratio) of a catalyst is preferably more than 1.75 and 2.5 or less, and more preferably 1.8 to 2.4.

Meanwhile, in the present specification, the R' value is obtained by measuring Raman spectrum of a catalyst (or a catalyst carrier precursor which will be described later) by using a micro Raman spectrometer and calculating the relative intensity ratio between the peak intensity around 1620 cm$^{-1}$ (D' intensity) referred to as a D' band and the peak intensity around 1580 cm$^{-1}$ (G intensity) referred to as a G band, that is, the peak area ratio of (D' intensity/G intensity). Similarly, the R value is obtained by measuring Raman spectrum of a catalyst (or a catalyst carrier precursor which will be described later) by using a micro Raman spectrometer and calculating the relative intensity ratio between the peak intensity around 1360 cm$^{-1}$ (D intensity) referred to as a D band and the peak intensity around 1580 cm$^{-1}$ (G intensity) referred to as a G band, that is, the peak area ratio of (D intensity/G intensity). As for the peak area, the area obtained by Raman spectrometric measurement which is described below is used.

(Raman Spectrometry Measurement)

The Raman spectrum was measured using a microlaser Raman SENTERRA (manufactured by Bruker Optics K.K.) as a measuring apparatus, at room temperature (25° C.), exposure of 30 seconds×integration of 4 times, in the following conditions. Meanwhile, the peaks of G band, D' band and D band can be determined by peak fitting based on Gaussian distribution.

[Formula 1]
<Measurement Conditions>
Excitation wavelength: SHG of Nd:YAG, 532 nm
Laser output: 3 mW
Spot size: ~1 μm
Detector: CCD As for the catalyst, the volume ratio of a water vapor adsorption amount compared to a nitrogen adsorption amount at relative pressure (P/P0) of 0.5 in adsorption isotherm (hereinbelow, also referred to as water vapor adsorption amount/nitrogen adsorption amount) is 0.15 or more and 0.30 or less. Preferably, the water vapor adsorption amount/nitrogen adsorption amount is 0.18 or more and 0.25 or less. As the water vapor adsorption amount/nitrogen adsorption amount is 0.15 or more, the catalyst becomes hydrophilic so that it becomes difficult to have adsorption with a hydrophobic moiety of a polymer electrolyte. Furthermore, as the water vapor adsorption amount/nitrogen adsorption amount is 0.30 or less, the adsorption by a hydrophilic group of a polymer electrolyte can be suppressed. Namely, when the water vapor adsorption amount/nitrogen adsorption amount is 0.15 or more and 0.30 or less, a good balance between hydrophillicity and hydrophobicity in the catalyst is obtained even when R' value is 0.6 or less, and thus the electrolyte partially coats the catalytic metal (only part of the electrolyte is in contact with the catalytic metal). Accordingly, sites not requiring pass-through of an electrolyte increase, and thus the gas transportability can be improved.

Herein, defining of the water vapor adsorption amount/nitrogen adsorption amount is made by replacing the whole surface area of particles with the nitrogen adsorption and replacing the hydrophilic surface area with the water vapor adsorption for a state in which gas (nitrogen and water vapor) is adsorbed as a single layer on a particle surface. When P/P0>0.5, a multilayer adsorption of gas molecules is initiated so that it is inappropriate to have the gas adsorption amount as an indicator of a surface area. On the other hand, for a region in which P/P0 is significantly lower than 0.5, the gas molecules adsorb not onto every particle surface. For such reasons, the water vapor adsorption amount/nitrogen adsorption amount is defined at P/P0=0.5.

The nitrogen adsorption amount indicates a nitrogen adsorption amount (cm$^3$/g) at relative pressure (P/P0) of 0.5 in adsorption isotherm, which is measured at the conditions described in the following Table 1.

The nitrogen adsorption isotherm is measured by carefully weighing about 0.02 to 0.04 g of the catalyst powder, adding it in a sample tube followed by sealing, and dried preliminary at the temperature and time for pre-treatment described in the following Table 1 to give a measurement sample. The measurement is then carried out according to the following measurement conditions. For the weighting, an electronic balance (AW220) manufactured by Shimadzu Corporation is used.

TABLE 1

| | |
|---|---|
| Measurement instrument | manufactured by BEL Japan, Inc. |
| Adsorbent | $N_2$ |
| Dead volume measurement gas | He |
| Measurement temperature | 77K (liquid nitrogen temperature) |
| Saturated vapor pressure $P_0$ | Atmospheric pressure |
| Incubator · pipe temperature | 35° C. |
| Measurement mode P/P$_0$ | Isothermal adsorption process and desorption process |
| Measurement relative pressure | About 0 to 1 |
| Setting time for equilibration | 180 s compared to 1 relative pressure (180 s after reaching the equilibrium pressure) |
| Temperature · time for pre-treatment | Deaeration under reduced pressure at 90° C. × about 5 hours |
| Sample amount | About 0.02 to 0.04 g |

Furthermore, the water vapor adsorption amount indicates a water vapor adsorption amount (cm$^3$/g) at relative pressure (P/P0) of 0.5 in adsorption isotherm, which is measured at the conditions described in the following Table 2.

The water vapor adsorption isotherm is measured by carefully weighing 0.0461 g of the catalyst powder, adding it in a sample tube followed by sealing, and dried preliminary at the temperature and time for pre-treatment described in the following Table 2 to give a measurement sample. The measurement is then carried out according to the following measurement conditions. For the weighting, an electronic balance (AW220) manufactured by Shimadzu Corporation is used.

TABLE 2

| | |
|---|---|
| Measurement instrument | manufactured by BEL Japan, Inc. |
| Adsorbent | $H_2O$ (molecular weight: 18) |
| Dead volume measurement gas | He |
| Measurement temperature | 80° C. |
| Saturated vapor pressure $P_0$ | 47.416 kPa (at 80° C.) |
| Incubator · pipe temperature | 100° C. |
| Measurement mode | Isothermal adsorption process and desorption process |
| Measurement relative pressure $P/P_0$ | About 0 to 1 |
| Setting time for equilibration | 500 s compared to 1 relative pressure (measured for 500 s after reaching the equilibrium pressure) |
| Temperature · time for pre-treatment | Deaeration under reduced pressure at 90° C. × about 5 hours |
| Sample amount | 0.0461 g |

With regard to the catalyst, it is preferable that an acidic group is present on a surface of the catalyst particle or on a surface of pores and the amount of the acidic group per weight of a carrier is preferably 0.7 mmol/g carrier or more. The acidic group is not particularly limited, it if is a functional group which can release protons upon dissociation. However, it preferably contains at least one selected from a group consisting of a hydroxyl group, a lactone group, and a carboxy group. When the carrier contains carbon, the acidic group preferably contains a hydroxyl group, a lactone group, or a carboxy group. When the carrier contains metal oxide, the acidic group preferably contains a hydroxyl group. Those acidic groups are a hydrophilic group, and even when a catalyst with R' value of 0.6 or less is used, a catalyst surface with hydrophilic-like property can be provided and adsorption of an electrolyte on a catalytic metal can be obtained at an appropriate level.

The amount of the acidic group is preferably more than 0.75 mmol/g carrier, more preferably 1.2 mmol/g carrier or more, and even more preferably 1.8 mmol/g carrier or more. Meanwhile, the upper limit of the amount of the acidic group is, although not particularly limited, preferably 3.0 mmol/g carrier or less, and more preferably 2.5 mmol/g carrier or less from the viewpoint of carbon durability.

The amount of the acidic group can be measured by a titration method using an alkali compound. Specifically, it can be measured by the following method.

[Measurement of Amount of Acidic Group]

First, 2.5 g of catalyst powder having an acidic group is washed with 1 liter of hot pure water followed by drying. After the drying, it was weighed such that the carbon amount contained in the catalyst having an acidic group is 0.25 g, and after stirring with 55 ml of water for 10 minutes, it was subjected to ultrasonic dispersion for 2 minutes. Next, the catalyst dispersion is transferred to a glove box purged with nitrogen gas, and bubbled with nitrogen gas for 10 minutes. And, to the catalyst dispersion, 0.1 M aqueous base solution is added in an excess amount, and by performing neutralization treatment of this basic solution with 0.1 M hydrochloric acid, the amount of functional group is quantified based on the neutralization point. Herein, as an aqueous base solution, three kinds including NaOH, $Na_2CO_3$, and $NaHCO_3$ were used, and the neutralization titration operation is performed for each, because the type of the functional group to be neutralized is different for each base used. In the case of NaOH, the neutralization reaction occurs with a carboxy group, a lactone group, and a hydroxyl group. In the case of $Na_2CO_3$, the neutralization reaction occurs with a carboxy group and a lactone group. In the case of $NaHCO_3$, the neutralization reaction occurs with a carboxy group. Based on the type and amount of the base for three kinds of a base added for titration and the resulting amount of consumed hydrochloric acid, the amount of an acidic group is calculated. Meanwhile, for determination of a neutralization point, a pH meter is used. In the case of NaOH, the neutralization point is pH 7.0. In the case of $Na_2CO_3$, it is pH 8.5. In the case of $NaHCO_3$, it is pH 4.5. Accordingly, the total amount of a carboxy group, a lactone group, and a hydroxyl group that are added to the catalyst is obtained.

The catalyst (after supporting of catalytic metal) preferably has (III) BET specific surface area of at least 900 $m^2$/g carrier. More preferably, it is 1000 $m^2$/g catalyst or more, even more preferably 1000 to 3000 $m^2$/g catalyst, and particularly preferably 1100 to 1800 $m^2$/g catalyst. With this specific surface area, the catalyst has a sufficient specific surface area so that large electric double layer capacity can be achieved.

In the case of the specific surface area as described above, sufficient mesopores and micropores that are described below can be secured, thus while securing micropores (lower gas transport resistance) sufficient for gas transport, more catalytic metal can be stored (carried) in the mesopores. Also, the electrolyte and the catalytic metal in the catalyst layer can be physically separated (contact between the electrolyte and the catalytic metal can be more effectively suppressed and prevented). Therefore, the activity of the catalytic metal can be more effectively utilized. In addition, as the micropores function as a transport path of gas, a three-phase interface with water is more significantly formed so that and the catalytic reaction can be more effectively promoted.

According to this embodiment, part of the catalyst is coated with an electrolyte so that clogging by the electrolyte of an entrance of a mesopore in which a catalytic metal is supported can be suppressed, and thus efficient transport of gas to the catalytic metal can be achieved.

Meanwhile, the "BET specific surface area ($m^2$/g catalyst)" in the present specification is measured by the nitrogen adsorption method. In detail, about 0.04 to 0.07 g of sample (carbon powder, catalyst powder) is accurately weighed, and sealed in a test tube. The test tube is preliminarily dried in a vacuum dryer at 90° C. for several hours to obtain a measurement sample. An electronic balance (AW220) manufactured by Shimadzu Corporation is used for weighing. Meanwhile, as for the coated sheet, about 0.03 to 0.04 g of the net weight of a coating layer in which the weight of Teflon (registered trademark) (substrate) of the same area is deducted from the total weight of the coated sheet is used as a sample weight. Next, the BET specific surface area is measured at the following measurement conditions. A BET plot is obtained from a relative pressure (P/P0) range of about 0.00 to 0.45, in the adsorption side of the adsorption and desorption isotherms, thereby calculating the BET specific surface area from the slope and intercept thereof.

[Formula 2]

<Measurement Conditions>

Measurement instrument: High accuracy all-automated gas adsorption instrument manufactured by BEL Japan, Inc. BELSORP 36

Adsorption gas: $N_2$

Dead volume measurement gas: He
Adsorption temperature: 77 K (temperature of liquid nitrogen)
Pre-measurement treatment: vacuum dry at 90° C. for several hours (set on the measurement stage after purging with He)
Measurement mode: isothermal adsorption process and desorption process
Measurement relative pressure $P/P_0$: about 0 to 0.99
Setting time for equilibration: 180 seconds for every relative pressure The catalyst preferably satisfies one of the following (a) to (c):

(a) the catalyst has pores with a radius of less than 1 nm and pores with a radius of 1 nm or more, a pore volume in the pores with a radius of less than 1 nm is 0.3 cc/g carrier or more, and the catalytic metal is supported inside the pores with a radius of 1 nm or more;

(b) the catalyst has pores with a radius of 1 nm or more and less than 5 nm, a pore volume of the pores is 0.8 cc/g carrier or more, and the catalytic metal has a specific surface area of 60 $m^2$/g carrier or less; and (c) the catalyst has pores with a radius of less than 1 nm and pores with a radius of 1 nm or more, a mode radius of pore distribution in the pores with a radius of less than 1 nm is 0.3 nm or more and less than 1 nm, and the catalytic metal is supported inside the pores with a radius of 1 nm or more.

Meanwhile, in the present specification, the catalyst satisfying the above (a) is also referred to as the "catalyst (a)", the catalyst satisfying the above (b) is also referred to as the "catalyst (b)", and the catalyst satisfying the above (c) is also referred to as the "catalyst (c)".

Instead of the above, or in addition to the above, the catalyst preferably satisfies the following (d):

(d) the catalyst has a mode radius of pores with a radius of 1 nm or more of pore distribution of 1 nm or more and less than 5 nm, the catalytic metal is supported inside the pores with a radius of 1 nm or more, the mode radius is the same or less than the average particle radius of the catalytic metal, and a pore volume in the pores with a radius of 1 nm or more and less than 5 nm is 0.4 cc/g carrier or more.

Meanwhile, in the present specification, the catalyst satisfying the above (d) is also referred to as the "catalyst (d)".

Hereinbelow, the catalyst (a) to (d) are described in detail as preferred modes.

(Catalysts (a) and (c))

The catalyst (a) contains a catalyst carrier and a catalytic metal supported on the catalyst carrier and satisfies the following constitutions (a-1) to (a-3):

(a-1) the catalyst has pores with a radius of less than 1 nm (primary pores) and pores with a radius of 1 nm or more (primary pores);

(a-2) a pore volume of the pores with a radius of less than 1 nm is 0.3 cc/g carrier or more; and (a-3) the catalytic metal is supported inside the pores with a radius of 1 nm or more.

In addition, the catalyst (c) contains a catalyst carrier and a catalytic metal supported on the catalyst carrier and satisfies the following constitutions (a-1), (c-1) and (a-3):

(a-1) the catalyst has pores with a radius of less than 1 nm and pores with a radius of 1 nm or more;

(c-1) a mode radius of pore distribution in the pores with a radius of less than 1 nm have is 0.3 nm or more and less than 1 nm; and (a-3) the catalytic metal is supported inside the pores with a radius of 1 nm or more.

Meanwhile, in the present specification, the pores with a radius of less than 1 nm are also referred to as a "micropore." In addition, in the present specification, the pores with a radius 1 nm or more are also referred to as a "mesopore."

As described above, the inventors of the present invention have found that, even when a catalytic metal does not contact an electrolyte, the catalytic metal can be effectively used by forming three-phase interfaces with water. Therefore, in the catalysts (a) and (c), by adopting a constitution that the (a-3) the catalytic metal is supported inside the mesopores in which the electrolyte cannot enter, and thus the catalytic activity can be improved. Meanwhile, when the catalytic metal is supported inside the mesopores in which the electrolyte cannot enter, the transport distance of gas such as oxygen is increased, and gas transportability is lowered, thus a sufficient catalytic activity cannot be elicited, and catalytic performance is deteriorated under high load conditions. On the other hand, if the (a-2) the pore volume of micropores in which the electrolyte and the catalytic metal may not or cannot enter at all is sufficiently secured, or the (c-1) the mode radius of the micropores is set large, the transport path of gas can be sufficiently secured. Therefore, gas such as oxygen can be efficiently transported to the catalytic metal in the mesopores, namely, gas transport resistance can be reduced. According to this constitution, gas (for example, oxygen) passes through micropores (gas transportability is improved), and gas can be efficiently contacted with the catalytic metal. Therefore, when the catalysts (a) and (c) are used in the catalyst layer, micropores are present in large volume, thus a reaction gas can be transported to the surface of the catalytic metal present in the mesopores via the micropores (path), and gas transport resistance can be further reduced. Therefore, the catalyst layer containing the catalysts (a) and (c) can exhibit higher catalytic activity, namely, the catalytic reaction can be further promoted. Therefore, the membrane electrode assembly and the fuel cell having the catalyst layer containing the catalysts (a) and (c) can further increase power generation performance.

FIG. 2 is a schematic explanatory cross-sectional view illustrating the shape and structure of the catalysts (a) and (c). As illustrated in FIG. 2, the catalysts (a) and (c) illustrated by 20 consist of a catalytic metal 22 and a catalyst carrier 23. Also, a catalyst 20 has pores 25 with a radius of less than 1 nm (micropores) and pores 24 with a radius of 1 nm or more (mesopores). The catalytic metal 22 is supported inside the mesopores 24. Also, it is enough that at least a part of the catalytic metal 22 is supported inside the mesopores 24, and a part may be supported on the surface of the catalyst carrier 23. However, it is preferable that substantially all of the catalytic metal 22 is supported inside the mesopores 24, from the viewpoint of preventing the contact between the electrolyte and the catalytic metal in the catalyst layer. The phrase "substantially all of the catalytic metal" is not particularly limited so long as it is the amount that can sufficiently improve the catalytic activity. The phrase "substantially all of the catalytic metal" is present in an amount of preferably 50% by weight or more (upper limit: 100% by weight) and more preferably 80% by weight or more (upper limit: 100% by weight), in the whole catalytic metal.

The phrase "the catalytic metal is supported inside the mesopores" herein can be confirmed by reduction in the volume of mesopores before and after supporting the catalytic metal on the catalyst carrier precursor. In detail, the catalyst carrier precursor has micropores and mesopores, and each pore has a certain volume, but when the catalytic metal is supported in these pores, the volume of each pore is reduced. Therefore, when the difference between the volume of mesopores of the catalyst carrier precursor before supporting the catalytic metal and the volume of mesopores of the catalyst powder after supporting the catalytic metal [=(volume before supporting)−(volume after supporting)] exceeds 0, it means that "the catalytic metal is supported inside the mesopores". Similarly, when the difference between the volume of micropores of the catalyst carrier precursor before supporting the catalytic metal and the volume of micropores of the catalyst powder after supporting the catalytic metal [=(volume before supporting)−(volume after supporting)] exceeds 0, it means that "the catalytic metal is supported inside the micropores". Preferably, the catalytic metal is supported in the mesopores more than in the micropores (reduction value of the volume of mesopores between before and after supporting>reduction value of the volume of micropores between before and after supporting). It is because gas transport resistance is reduced, and thus a path for gas transport can be sufficiently secured. The reduction value of the pore volume of mesopores between before and after supporting the catalytic metal is preferably 0.02 cc/g or more, and more preferably 0.02 to 0.4 cc/g, in consideration of the reduction in gas transport resistance, securing of the path for gas transport, and the like.

In addition, it is preferable that the pore volume of pores with a radius of less than 1 nm (micropores) (of the catalyst after supporting the catalytic metal) is 0.3 cc/g carrier or more, and/or the mode radius (modal radius) of pore distribution of micropores (of the catalyst after supporting the catalytic metal) is 0.3 nm or more and less than 1 nm. More preferably, the pore volume of micropores is 0.3 cc/g carrier or more, and the mode radius of pore distribution of micropore is 0.3 nm or more and less than 1 nm. When the pore volume and/or mode radius of micropores is within the above range, micropores sufficient for gas transport can be secured, and gas transport resistance is small. Therefore, a sufficient amount of gas can be transported to the surface of the catalytic metal present in the mesopores via the micropores (path), thus a high catalytic activity can be exhibited, namely, the catalytic reaction can be promoted. Also, electrolyte (ionomer) and liquid (for example, water) cannot enter the micropores, only gas is selectively passed (gas transport resistance can be reduced). The pore volume of micropores is more preferably 0.3 to 2 cc/g carrier, and particularly preferably 0.4 to 1.5 cc/g carrier, in consideration of the effect of improving gas transportability. In addition, the mode radius of pore distribution of micropores is more preferably 0.4 to 1 nm, and particularly preferably 0.4 to 0.8 nm. The pore volume of pores with a radius of less than 1 nm is herein also simply referred to as "the pore volume of micropores". Similarly, the mode radius of pore distribution of micropores is herein also simply referred to as "the mode radius of micropores".

The pore volume of the pores with a radius of 1 nm or more and less than 5 nm (mesopores) in catalyst (a) or (c) is not particularly limited, but is preferably 0.4 cc/g carrier or more, more preferably 0.4 to 3 cc/g carrier, and particularly preferably 0.4 to 1.5 cc/g carrier. When the pore volume is within the above range, more catalytic metal can be stored (supported) in the mesopores, and the electrolyte and the catalytic metal in the catalyst layer can be physically separated (contact between the catalytic metal and the electrolyte can be more effectively suppressed and prevented). Therefore, the activity of the catalytic metal can be more effectively utilized. Also, by the presence of many mesopores, the catalytic reaction can be more effectively promoted. In addition, the micropores act as a transport path of gas, and three-phase interfaces are more remarkably formed by water, thus the catalytic activity can be further improved. The pore volume of pores with a radius of 1 nm or more and less than 5 nm is herein also simply referred to as "the pore volume of mesopores".

The mode radius (modal radius) of pore distribution of pores with a radius of 1 nm or more (mesopores) in catalyst (a) or (c) is not particularly limited, but is preferably 1 to 5 nm, more preferably 1 to 4 nm, and particularly preferably 1 to 3 nm. In the case of the mode radius of pore distribution of mesopores described above, a more sufficient amount of the catalytic metal can be stored (supported) in the mesopores, and the electrolyte and the catalytic metal in the catalyst layer can be physically separated (contact between the catalytic metal and the electrolyte can be more effectively suppressed and prevented). Therefore, the activity of the catalytic metal can be more effectively utilized. Also, by the presence of large-volume mesopores, the catalytic reaction can be more effectively promoted. In addition, the micropores act as a transport path of gas, and three-phase interfaces are more remarkably formed by water, thus the catalytic activity can be further improved. The mode radius of pore distribution of mesopores is herein also simply referred to as "the mode radius of mesopores".

The "radius of pores of micropores (nm)" in the present specification refers to a radius of pores measured by the nitrogen adsorption method (MP method). Also, the "mode radius of pore distribution of micropores (nm)" herein refers to a pore radius at a point taking a peak value (maximum frequency) in the differential pore distribution curve that is obtained by the nitrogen adsorption method (MP method). The lower limit of the pore radius of micropores is the lower limit that can be measured by the nitrogen adsorption method, that is, 0.42 nm or more. Similarly, the "radius of pores of mesopores (nm)" refers to a radius of pores measured by the nitrogen adsorption method (DH method). Also, the "mode radius of pore distribution of mesopores (nm)" refers to a pore radius at a point taking a peak value (maximum frequency) in the differential pore distribution curve that is obtained by the nitrogen adsorption method (DH method). Herein, the upper limit of the pore radius of mesopores is not particularly limited, but is 5 nm or less.

The "pore volume of micropores" in the present specification refers to a total volume of micropores with a radius of less than 1 nm present in the catalyst, and expressed as a volume per 1 g of the carrier (cc/g carrier). The "pore volume of micropores (cc/g carrier)" is calculated as a downside area (integrated value) under the differential pore distribution curve obtained by the nitrogen adsorption method (MP method). Similarly, the "pore volume of mesopores" refers to a total volume of mesopores with a radius of 1 nm or more and less than 5 nm present in the catalyst, and expressed as a volume per 1 g of the carrier (cc/g carrier). The "pore volume of mesopores (cc/g carrier)" is calculated as a downside area (integrated value) under the differential pore distribution curve obtained by the nitrogen adsorption method (DH method).

The "differential pore distribution" in the present specification refers to a distribution curve obtained by plotting a pore size on the horizontal axis and a pore volume corresponding to the pore size in the catalyst on the vertical axis. That is to say, in the case of regarding the pore volume of the catalyst obtained by the nitrogen adsorption method (MP method in the case of micropores; DH method in the case of mesopores) as V and the pore diameter as D, a value (dV/d (log D)) obtained by dividing that differential pore volume dV by logarithmic difference of the pore diameter d (log D) is determined. Moreover, the differential pore distribution curve is obtained by plotting this dV/d (log D) to the average pore diameter of each section. The differential pore volume dV indicates the increment of the pore volume between measuring points.

The method for measuring the radius of micropores and pore volume by the nitrogen adsorption method (MP method) is not particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and R. Sh. Mikhail, S. Brunauer, E. E. Bodor J. Colloid Interface Sci., 26, 45 (1968) can be used. The radius of micropores and pore volume by the nitrogen adsorption method (MP method) are a value herein measured by the method described in R. Sh. Mikhail, S. Brunauer, E. E. Bodor J. Colloid Interface Sci., 26, 45 (1968).

The method for measuring the radius of mesopores and pore volume by the nitrogen adsorption method (DH method) is not also particularly limited, and for example, the method described in known documents such as "Science of Adsorption" (second edition, written jointly by Seiichi Kondo, Tatsuo Ishikawa and Ikuo Abe, MARUZEN Co., Ltd.), "Fuel Cell Characterization Methods" (edited by Yoshio Takasu, Masaru Yoshitake, Tatsumi Ishihara, Kagaku-Dojin Publishing Co., Inc.), and D. Dollion, G. R. Heal: J. Appl. Chem., 14, 109 (1964) can be used. The radius of mesopores and pore volume by the nitrogen adsorption method (DH method) are a value herein measured by the method described in D. Dollion, G. R. Heal: J. Appl. Chem., 14, 109 (1964).

The method for producing the catalyst having specific pore distribution as described above is not particularly limited, but it is usually important that the pore distribution (micropores and mesopores in some cases) of the carrier is set to the pore distribution described above. Specifically, as the method for producing a carrier having micropores and mesopores, and a pore volume of micropores of 0.3 cc/g carrier or more, the methods described in publications such as JP 2010-208887 A (specification of US 2011/318,254, the same applies hereafter) and WO 2009/75264 A (specification of US 2011/058,308, the same applies hereafter) are preferably used. Furthermore, as a method for producing a carrier having micropores and mesopores, and having micropores with a mode radius of pore distribution of 0.3 nm or more and less than 1 nm, the methods described in publications such as JP 2010-208887 A and WO 2009/75264 A are preferably used.

(Catalyst (b))

The catalyst (b) contains a catalyst carrier and a catalytic metal supported on the catalyst carrier and satisfies the following constitutions (b-1) to (b-3):

(b-1) the catalyst has pores with a radius of 1 nm or more and less than 5 nm;

(b-2) a pore volume in the pores with a radius of 1 nm or more and less than 5 nm is 0.8 cc/g carrier or more; and (b-3) a specific surface area of the catalytic metal is 60 $m^2/g$ carrier or less.

According to the catalyst having the constitutions of the (b-1) to (b-3) described above, filling of the pores of the catalyst with water is suppressed, and then pores contributing to transport of a reaction gas is sufficiently secured. As a result, a catalyst excellent in gas transportability can be provided. In detail, the volume of mesopores effective for gas transport is sufficiently secured, and further, the specific surface area of the catalytic metal is reduced, and thus the amount of the water maintained in the mesopores in which the catalytic metal is supported can be sufficiently reduced. Therefore, filling of the inside of the mesopores with water is suppressed, thus gas such as oxygen can be more efficiently transported to the catalytic metal in the mesopores. In other words, the gas transport resistance in the catalyst layer can be further reduced. As a result, the catalytic reaction is promoted, and the catalyst (b) of this embodiment can exhibit higher catalytic activity. Therefore, a membrane electrode assembly and a fuel cell having a catalyst layer using the catalyst (b) of this embodiment are excellent in power generation performance.

FIG. 3 is a schematic explanatory cross-sectional view illustrating the shape and structure of the catalysts (b) according to an embodiment of the present invention. As illustrated in FIG. 3, the catalyst 20' of the present invention consists of a catalytic metal 22' and a catalyst carrier 23'. The catalyst 20' has pores 24' with a radius of 1 nm or more and less than 5 nm (mesopores). The catalytic metal 22' is mainly supported inside the mesopores 24'. Also, it is enough that at least a part of the catalytic metal 22' is supported inside the mesopores 24', and a part may be supported on the surface of the catalyst carrier 23'. However, it is preferable that substantially all the catalytic metal 22' is supported inside the mesopores 24', from the viewpoint of preventing the contact between the electrolyte (electrolyte polymer, ionomer) and the catalytic metal in the catalyst layer. When the catalytic metal contacts the electrolyte, the area ratio activity of the surface of the catalytic metal is reduced. On the other hand, according to the above constitution, it is possible to make the electrolyte not to enter the mesopores 24' of the catalyst carrier 23', and thus the catalytic metal 22' and the electrolyte can be physically separated. Moreover, three-phase interfaces can be formed with water, and consequently the catalytic activity is improved. The phrase "substantially all the catalytic metal" is not particularly limited so long as it is the amount that can sufficiently improve the catalytic activity. The "substantially all the catalytic metal" is present in an amount of preferably 50% by weight or more (upper limit: 100% by weight) and more preferably 80% by weight or more (upper limit: 100% by weight), in the whole catalytic metal.

The pore volume of pores with a radius of 1 nm or more and less than 5 nm (mesopores) in the catalyst (b) is 0.8 cc/g carrier or more. The pore volume of mesopores is preferably 0.8 to 3 cc/g carrier, and particularly preferably 0.8 to 2 cc/g carrier. In a case where the pore volume is within the range described above, pores contributing to transport of a reaction gas is much secured, thus transport resistance of the reaction gas can be reduced. Therefore, the reaction gas can be rapidly transported to the surface of the catalytic metal stored in the mesopores, thus the catalytic metal is effectively utilized. Furthermore, in a case where the volume of mesopores is within the range described above, the catalytic metal can be stored (supported) in the mesopores, and the electrolyte and the catalytic metal in the catalyst layer can be physically separated (contact between the electrolyte and the catalytic metal can be more effectively suppressed and prevented). As described above, in the embodiment in which the contact between the catalytic metal in the mesopores and the electrolyte is suppressed, the activity of the catalyst can be more effectively utilized, as compared with the case where the amount of the catalytic metal supported on the surface of the carrier is high.

In addition, in the catalyst (b), the catalytic metal (catalyst component) has a specific surface area of 60 $m^2/g$ carrier or less. The catalytic metal has a specific surface area of preferably 5 to 60 m$^2$/g carrier, more preferably 5 to 30 m$^2$/g carrier, and particularly preferably 10 to 25 m$^2$/g carrier. The surface of the catalytic metal is hydrophilic, and water generated by catalytic reaction is likely to adsorb, thus water is likely to be maintained in the mesopores in which the catalytic metal is stored. When water is maintained in the mesopores, gas transport path becomes narrow, and the diffusion rate of the reaction gas in water is low, thus gas transportability is reduced. On the other hand, when the specific surface area of the catalytic metal is set relatively small as the above range, the amount of water adsorbed to the surface of the catalytic metal can be reduced. As a result, water is hard to be maintained in the mesopores, and the water content in the catalyst and also in the catalytic layer can be reduced. Therefore, transport resistance of the reaction gas can be reduced, and the catalytic metal is effectively utilized. The "specific surface area of the catalytic metal" in the present invention can be measured by the method described in, for example, Journal of Electroanalytical Chemistry 693 (2013) 34 to 41, or the like. The "specific surface area of the catalytic metal" herein adopts the value measured by the following method.

(Method for Measuring Specific Surface Area of Catalytic Metal)

With regard to the cathode catalyst layer, electrochemical effective surface area (ECA) is measured by cyclic voltammetry. Hydrogen gas humidified so as to be saturated at a measurement temperature is flowed into the opposed anode, and this anode is used as a reference electrode and a counter electrode. Nitrogen gas similarly humidified is flowed into the cathode, and valves of entrance and exit of the cathode are closed immediately before starting measurement, and nitrogen gas is sealed. Measurement is performed in this state, in the following conditions, using an electrochemical measuring system (manufactured by HOKUTO DENKO CORP., model: HZ-5000).

[Formula 3]

Electrolyte solution: 1M sulfuric acid (manufactured by Wako Pure Chemical Industries Ltd., for measurement of harmful metal)

Scanning rate: 50 mV/s

Number of cycles: 3 cycles

Lower limit voltage value: 0.02 V

Upper limit voltage value: 0.9 V

The method for producing the catalyst having specific pore volume as described above is not particularly limited, but it is usually important that the mesopore volume of the carrier is set to the pore distribution described above. Specifically, as the method for producing a carrier having mesopores, and a mesopore volume of 0.8 cc/g carrier or more, the methods described in publications such as JP 2010-208887 A (specification of US 2011/318,254, the same applies hereafter) and WO 2009/075264 A (specification of US 2011/058,308 A, the same applies hereafter) are preferably used.

It is preferable that, in the catalysts (a) and (c), at least apart of the catalytic metal is supported inside the mesopores, and in the catalyst (b), at least a part of the catalytic metal is supported inside the mesopores. Here, the size of the catalytic metal supported in the mesopores when the catalytic metal is supported in the mesopores is preferably larger than the size of the mesopores (Embodiment (i)). According to the constitution, the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall of the pore, and thus a reaction of forming a metal oxide becomes slow, and a metal oxide is hard to be formed. As a result, deactivation of the surface of the catalytic metal can be further suppressed. Therefore, the catalyst of this Embodiment (i) can exhibit higher catalytic activity, namely, the catalytic reaction can be further promoted.

In Embodiment (i), the mode radius (modal radius) of pore distribution of mesopores (of the catalyst after supporting the catalytic metal) is preferably 1 nm or more and 5 nm or less, more preferably 1 nm or more and 4 nm or less, further preferably 1 nm or more and 3 nm or less, and particularly preferably 1 nm or more and 2 nm or less. With the mode radius of pore distribution as described above, the sufficient amount of the catalytic metal can be stored (supported) in the mesopores, and the electrolyte and the catalytic metal in the catalyst layer can be physically separated (contact between the catalytic metal and the electrolyte can be more effectively suppressed and prevented). Therefore, the activity of the catalytic metal can be more effectively utilized. Furthermore, due to the presence of pores with large volume (mesopores), the activity and effect of the present invention can be more significantly exhibited so that the catalyst reaction can be more effectively promoted.

In Embodiment (i), the average particle size of the catalytic metal (catalytic metal particles) (of the catalyst after supporting the catalytic metal) is preferably 2 nm or more and 7 nm or less, and more preferably 3 nm or more and 5 nm or less. When the average particle size of the catalytic metal is twice or more of the mode radius of pore distribution as described above (when the mode radius is half or less of the average particle size of the catalytic metal), the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall, and thus a reaction of forming a metal oxide becomes slow, and a metal oxide is hard to be formed. As a result, deactivation of the surface of the catalytic metal can be suppressed, and high catalytic activity can be exhibited. Namely, the catalytic reaction can be promoted. Also, the catalytic metal is relatively firmly supported in the pores (mesopores), and the contact with the electrolyte in the catalyst layer is more effectively suppressed and prevented. Moreover, elution due to potential change is prevented, and temporal performance deterioration can be also suppressed. Therefore, catalytic activity can be further improved, namely, the catalytic reaction can be more efficiently promoted.

(Catalyst (d))

The catalyst (d) contains a catalyst carrier and a catalytic metal supported on the catalyst carrier and satisfies the following constitutions (d-1) to (d-4):

(d-1) the catalyst has pores with a radius of 1 nm or more having a mode radius of pore distribution of 1 nm or more and less than 5 nm;

(d-2) the catalytic metal is supported inside the pores with a radius of 1 nm or more;

(d-3) the mode radius is half or less of the average particle size of the catalytic metal; and (d-4) a pore volume in the pores with a radius of 1 nm or more and less than 5 nm is 0.4 cc/g carrier or more. Meanwhile, as described herein, "half of the average particle size (½ times of the average particle size)" is also referred to as "average particle radius."

According to the catalyst having the constitutions of the (d-1) to (d-4) described above, by taking a constitution that the catalytic metal is supported inside the pores (mesopores) in which the electrolyte cannot enter, the catalytic metal inside the pores forms three-phase interfaces with water, and the catalyst can be effectively utilized. As a result, the activity of the catalyst can be improved. In detail, particularly, the (d-3) the mode radius of the pores is set to half or less of the average particle size of the catalytic metal, and thus the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall of the pore, and thus a reaction of forming a metal oxide becomes slow, and a metal oxide is hard to be formed. As a result, deactivation of the surface of the catalytic metal can be further suppressed. Thus, the catalyst (d) of this embodiment can exhibit high catalytic activity, namely, the catalytic action can be promoted. Therefore, a membrane electrode assembly and a fuel cell having a catalyst layer using the catalyst (d) of this embodiment are excellent in power generation performance.

The catalyst (d) according to an embodiment of the present invention contains a catalytic metal and a carrier. The catalyst also has pores (mesopores). Herein, the catalytic metal is supported inside the mesopores. Also, it is sufficient that at least a part of the catalytic metal is supported inside the mesopores, and a part may be supported in the surface of the carrier. However, it is preferable that substantially all the catalytic metal is supported inside the mesopores, from the viewpoint of preventing the contact between the electrolyte and the catalytic metal in the catalyst layer. The "substantially all the catalytic metal" is not particularly limited so long as it is the amount that can sufficiently improve the catalytic activity. The "substantially all the catalytic metal" is present in an amount of preferably 50% by weight or more (upper limit: 100% by weight) and more preferably 80% by weight or more (upper limit: 100% by weight), in the whole catalytic metal.

The pore volume of the mesopores of the catalyst (d) is 0.4 cc/g carrier or more, preferably 0.45 to 3 cc/g carrier, and more preferably 0.5 to 1.5 cc/g carrier. When the pore volume is in the above range, more catalytic metal can be stored (supported) in the mesopores, and the electrolyte and the catalytic metal in the catalyst layer can be physically separated (contact between the catalytic metal and the electrolyte can be more effectively suppressed and prevented). Therefore, the activity of the catalytic metal can be more effectively utilized. In addition, by the presence of many mesopores, the catalytic reaction can be more effectively promoted.

The mode radius (modal radius) of pore distribution of the pores of the catalyst (d) is 1 nm or more and less than 5 nm, preferably 1 nm or more and 4 nm or less, more preferably 1 nm or more and 3 nm or less, and further preferably 1 nm or more and 2 nm or less. In the case of the mode radius of pore distribution as described above, a sufficient amount of the catalytic metal can be stored (supported) in the mesopores, and the electrolyte and the catalytic metal in the catalyst layer can be physically separated (contact between the catalytic metal and the electrolyte can be more effectively suppressed and prevented). Therefore, the activity of the catalytic metal can be more effectively utilized. In addition, by the presence of pores with large volume (mesopores), the action and effect according to the present invention are more remarkably exhibited, and the catalytic reaction can be more effectively promoted.

The method for producing the catalyst having specific pore distribution as described above is not particularly limited, but it is usually important that the mesopore volume of the carrier and so on is set to the pore distribution described above. As the method for producing those carriers, the methods described in publications such as JP 2010-208887 A and WO 2009/075264 A are preferably used.

(Catalyst Carrier)

The catalyst carrier contains carbon as a main component (hereinbelow, also simply referred to as a "carrier"). The phrase "contain(s) carbon as a main component" herein is a concept containing both "consist(s) only of carbon" and "consist(s) substantially of carbon", and an element other than carbon may be contained. The phrase "consist(s) substantially of carbon" refers to that 80% by weight or more of a whole, and preferably 95% by weight or more of a whole (upper limit: less than 100% by weight) consists of carbon.

The catalyst carrier is, although not particularly limited, preferably carbon powder. Specifically, examples include carbon powder made of carbon black (such as ketjen black, oil furnace black, channel black, lamp black, thermal black and acetylene black), and activated carbon.

The BET specific surface area of the catalyst carrier is preferably 900 $m^2/g$ catalyst carrier or more, more preferably 1000 $m^2/g$ catalyst carrier or more, further preferably 1000 to 3000 $m^2/g$ catalyst carrier, particularly preferably 1100 to 1800 $m^2/g$ catalyst carrier. Since the specific surface area of the catalyst carrier is substantially the same even when the oxidative treatment and the catalyst metal supporting treatment are performed as described later, the specific surface area between the catalyst carrier precursor and the catalyst carrier is substantially the same.

In the case of the specific surface area as described above, sufficient mesopores and micropores that can be secured, thus while securing micropores (lower gas transport resistance) sufficient for gas transport, more catalytic metal can be stored (carried) in the mesopores. Also, the electrolyte and the catalytic metal in the catalyst layer can be physically separated (contact between the electrolyte and the catalytic metal can be more effectively suppressed and prevented). Therefore, the activity of the catalytic metal can be more effectively utilized. In addition, as the micropores function as a transport path of gas, a three-phase interface with water is more significantly formed so that and the catalytic reaction can be more effectively promoted.

According to this embodiment, part of the catalyst is coated with an electrolyte so that clogging by the electrolyte of an entrance of a mesopore in which a catalytic metal is supported can be suppressed, and thus efficient transport of gas to the catalytic metal can be achieved.

Furthermore, size of the catalyst carrier is not particularly limited. From the viewpoint of easy supporting, catalyst use rate, and controlling the thickness of an electrode catalyst layer within a suitable range, the average particle size (diameter) of the catalyst carrier is preferably 5 to 2000 nm, more preferably 10 to 200 nm, and particularly preferably 20 to 100 nm. As for the value of the "average particle size of a catalyst carrier", unless specifically described otherwise, a value which is measured by use of an observational means such as a scanning electron microscope (SEM) and a transmission electron microscope (TEM), and is calculated as an average value of particle size of the particles observed in several to several tens of visual fields is used. Similarly, the "particle size (diameter)" means, among the lengths of a line going through a center of a particle connecting any two points on a particle contour, the longest length.

When the catalyst satisfies the requirement of any of the above constitutions (a) to (d), it is preferable that the catalyst carrier also satisfies the same requirement of the constitutions (a) to (d).

It is preferable that the catalyst carrier satisfies at least one of the following constitutions (1) to (3). (1) (a-1) it has pores with a radius of less than 1 nm (primary pore) and pores with a radius of 1 nm or more (primary pore); and (a-2) a pore volume in the pores with a radius of less than 1 nm is 0.3 cc/g carrier or more. (2) (a-1) it has pores with a radius of less than 1 nm and pores with a radius of 1 nm or more; and (c-1) a mode radius of pore distribution in the pores with a radius of less than 1 nm is 0.3 nm or more and less than 1 nm. (3) (d-1) the mode radius of pore distribution in the pores with a radius of 1 nm or more is 1 nm or more and less than 5 nm; and (d-4) a pore volume in the pores with a radius of 1 nm or more and less than 5 nm is 0.4 cc/g carrier or more. Furthermore, in (3), it is preferable that (b-2) a pore volume in the pores with a radius of 1 nm or more and less than 5 nm is 0.8 cc/g carrier or more. More preferable range of the pore volume of micropores in (a-2), mode radius of pore distribution of micropores in (c-1), mode radius of pore distribution of pores with a radius of 1 nm or more in (d-1), pore volume of the pores with a radius of 1 nm or more and less than 5 nm in (d-4) and the like are the same as those described in the sections of the catalysts (a) to (d).

(Catalytic Metal)

The catalytic metal constituting the catalyst has a function of a catalytic action of an electrochemical reaction. The catalytic metal used in the anode catalyst layer is not particularly limited so long as it provides a catalytic action for the oxidation reaction of hydrogen, and a known catalyst can be similarly used. In addition, the catalytic metal used in the cathode catalyst layer is not also particularly limited so long as it provides a catalytic action for the reduction reaction of oxygen, and a known catalyst can be similarly used. Specifically, the catalytic metal can be selected from metals such as platinum, ruthenium, iridium, rhodium, palladium, osmium, tungsten, lead, iron, copper, silver, chromium, cobalt, nickel, manganese, vanadium, molybdenum, gallium, and aluminum, as well as their alloys.

Of these, those that contain at least platinum are preferably used, in order to improve catalytic activity, anti-toxicity against carbon monoxide and the like, heat resistance, and the like. Namely, the catalytic metal is preferably platinum or contains platinum and a metal component other than platinum, and is more preferably platinum or a platinum-containing alloy. Such catalytic metal can exhibit high activity. When the catalytic metal is platinum, in particular, platinum with small particle size can be dispersed on a surface of carbon powder (carrier), and thus the platinum surface are per weight can be maintained even when the use amount of platinum is lowered. Furthermore, when the catalytic metal contains platinum and a metal component other than platinum, use amount of expensive platinum can be lowered, and thus it is preferable from the economical point of view. The alloy compositions should preferably contain 30 to 90 atom % of platinum, although it depends on the type of metal to be alloyed, and the content of the metal to be alloyed with platinum should be 10 to 70 atom %. Alloy is a collective name of a combination of a metal element combined with one or more kinds of metal elements or non-metallic elements, such combination having metallic characteristics. The structure of an alloy can be an eutectic alloy which is a mixture of crystals of different component elements, a solid solution which is formed by completely molten component elements, a compound where the component elements are an intermetallic compound or a compound forming a compound of a metal with a non-metal, or the like, and may be any of them in the present application. In this case, the catalytic metal used in the anode catalyst layer and the catalytic metal used in the cathode catalyst layer may be appropriately selected from the above. Unless otherwise noted herein, the descriptions for catalytic metals for the anode catalyst layer and for the cathode catalyst layer have the same definitions for both. However, the catalytic metals for the anode catalyst layer and for the cathode catalyst layer need not be the same, and may be appropriately selected so as to provide the desired action described above.

The shape and size of the catalytic metal (catalyst component) are not particularly limited, and any shape and size similar to those of a known catalyst components can be adopted. For example, those having granular, scaly, or layered shape can be used, and granular shape is preferred.

The average particle size (diameter) of the catalytic metal (catalytic metal particles) is not particularly limited. However, it is preferably 3 nm or more, more preferably more than 3 nm and 30 nm or less, and particularly preferably more than 3 nm and 10 nm or less. If an average particle size of the catalytic metal is 3 nm or more, the catalytic metal is relatively firmly supported in the carbon powder (for example, inside the mesopores of carbon powder), and the contact with the electrolyte in the catalyst layer is more effectively suppressed and prevented. In addition, when the catalyst carrier has the micropores, the micropores are remained without being blocked by the catalytic metal, and transport path of gas is more favorably secured, and gas transport resistance can be further reduced. Moreover, elution due to potential change is prevented, and temporal performance deterioration can be also suppressed. Therefore, catalytic activity can be further improved, namely, the catalytic reaction can be more efficiently promoted. On the other hand, if an average particle size of the catalytic metal particles is 30 nm or less, the catalytic metal can be supported on the catalyst carrier (for example, inside the mesopores of carbon powder) by a simple method, and the electrolyte coating of the catalytic metal can be reduced. In the case of using the catalyst (a) and/or (c) as a catalyst, the average particle size of the catalytic metal (catalytic metal particles) is preferably 3 nm or more, more preferably more than 3 nm and 30 nm or less, and particularly preferably more than 3 nm and 10 nm or less. In addition, in the case of using the catalyst (b) as a catalyst, the average particle size of the catalytic metal (catalytic metal particles) is preferably more than 3 nm, more preferably more than 3 nm to 30 nm, and particularly preferably more than 3 nm to 10 nm. If an average particle size of the catalytic metal is more than 3 nm, the specific surface area of the catalytic metal can be made small. As a result, as described above, the amount of water adsorbed to the surface of the catalytic metal can be reduced, and mesopores contributing to transport of a reaction gas can be secured in a large amount. Therefore, transport resistance of the reaction gas can be reduced. Moreover, elution due to potential change is prevented, and temporal performance deterioration can be also suppressed. Therefore, catalytic activity can be further improved, namely, the catalytic reaction can be more efficiently promoted. On the other hand, if an average particle size of the catalytic metal particles is 30 nm or less, the catalytic metal can be supported inside the mesopores of the carrier by a simple method, and the electrolyte coating of the catalytic metal can be reduced. Furthermore, in the case of using the catalyst (d) as a catalyst, the average particle size of the catalytic metal is twice or more of the mode radius of pore distribution of mesopores (the mode radius is half or less of the average particle size of the catalytic metal). Here, the average particle size of the catalytic metal (catalytic metal particles) is preferably 2 nm or more and 7 nm or less, and more preferably 3 nm or more and 5 nm or less. When the average particle size of the catalytic metal is twice or more of the mode radius of pore distribution as described above, the distance between the catalytic metal and the inner wall of the pore of the carrier is reduced, and the space in which water can be present is reduced, namely, the amount of water adsorbed to the surface of the catalytic metal is reduced. Also, water is subjected to interaction of the inner wall, and thus a reaction of forming a metal oxide becomes slow, and a metal oxide is hard to be formed. As a result, deactivation of the surface of the catalytic metal can be suppressed, and high catalytic activity can be exhibited. Namely, the catalytic reaction can be promoted. Also, the catalytic metal is relatively firmly supported in the pores (mesopores), and the contact with the electrolyte in the catalyst layer is more effectively suppressed and prevented. Moreover, elution due to potential change is prevented, and temporal performance deterioration can be also suppressed. Therefore, catalytic activity can be further improved, namely, the catalytic reaction can be more efficiently promoted.

Meanwhile, the "average particle size of the catalytic metal particles" or the "average particle radius of the catalytic metal particles" in the present invention can be determined as the crystallite radius obtained from the half-band width of the diffraction peak of the catalytic metal component in the X-ray diffraction, or an average value of the particle diameter of the catalytic metal particles examined by using a transmission-type electron microscope (TEM). The "average particle size of the catalytic metal particles" or the "average particle radius of the catalytic metal" herein is a crystallite radius obtained from the half-band width of the diffraction peak of the catalytic metal component in the X-ray diffraction.

The content of the catalytic metal per unit catalyst coated area (mg/cm$^2$) is not particularly limited so long as sufficient dispersion degree of the catalyst on the carrier and power generation performance are obtained, and it is, for example, 1 mg/cm$^2$ or less. However, in a case where the catalyst contains platinum or a platinum-containing alloy, the platinum content per unit catalyst coated area is preferably 0.5 mg/cm$^2$ or less. Use of an expensive noble metal catalyst represented by platinum (Pt) or platinum alloy is a reason for yielding a fuel cell with high price. As such, it is preferable to cut the cost by lowering the use amount of expensive platinum (platinum content) to the aforementioned range. The lower limit value is not particularly limited so long as power generation performance is obtained, and it is 0.01 mg/cm$^2$ or more, for example. More particularly, the platinum content is 0.02 to 0.4 mg/cm$^2$. In the catalyst layer of this embodiment, electrolyte coating by a catalytic metal is suppressed so that the activity per catalyst weight can be improved. Accordingly, it is possible to reduce the use amount of a highly expensive catalyst.

In the present specification, the induction coupled plasma emission spectrometry (ICP) is used for measuring (confirming) the "catalytic metal (platinum) content per unit catalyst coated area (mg/cm$^2$)". The method for obtaining desired "catalytic metal (platinum) content per unit catalyst coated area (mg/cm$^2$)" can be also easily performed by a person skilled in the art, and the adjustment of the composition (catalyst concentration) and coating amount of slurry allows the control of the amount.

In addition, the supported amount of a catalytic metal in the carrier (also referred to as "supporting rate") is preferably 10 to 80% by weight, and more preferably 20 to 70% by weight relative to the whole amount of the catalyst (carrier and catalyst metal). The supported amount in the above-mentioned range is preferable by reason of allowing sufficient dispersion degree of the catalyst components on the carrier, the improvement in power generation performance, the economic advantages, and the catalytic activity per unit weight. Here, the "catalyst supporting rate" in the present invention is a value obtained by measuring the weights of the carrier before supporting the catalytic metal and the catalyst after supporting the catalytic metal.

(Polymer Electrolyte)

The polymer electrolyte is not particularly limited, but it is preferably a polymer electrolyte with ion conductivity. From the viewpoint of transferring protons that are generated near a catalyst active material on fuel electrode side, the polymer electrolyte is also referred to as a proton conductive polymer.

The polymer electrolyte is not particularly limited, and the conventionally known knowledge can be properly referred to. The polymer electrolyte is roughly divided into a fluorine-based polymer electrolyte and a hydrocarbon-based polymer electrolyte, depending on the kind of ion exchange resin that is a constituent material. Among them, a fluorine-based polymer electrolyte is preferred as a polymer electrolyte. By having the constitution of (I) above, the catalyst of this embodiment exhibits a more hydrophilic-like property even under conditions in which R' value is 0.6 or less. As such, it becomes difficult for the electrolyte to adsorb onto a catalyst even when the fluorine-based polymer electrolyte with high hydrophobicity is used, and thus it is more likely that the effect of the present invention is obtained at high level. Furthermore, from the viewpoint of having excellent heat resistance, chemical stability, durability, and mechanical strength, the fluorine-based polymer electrolyte is preferable.

Examples of the ion exchange resin that constitutes a fluorine-based polymer electrolyte include perfluorocarbon sulfonic acid based polymers such as Nafion (registered trademark, manufactured by Du Pont), Aciplex (registered trademark, manufactured by Asahi Kasei Corporation Ltd.), and Flemion (registered trademark, manufactured by Asahi Glass Co., LTD.), trifluorostyrene sulfonic acid based polymers, ethylene tetrafluoroethylene-g-styrene sulfonic acid based polymers, polyvinylidene fluoride-perfluorocarbon sulfonic acid based polymers, and the like. Among them, a fluorine-based polymer electrolyte consisting of a perfluorocarbon sulfonic acid based polymer is used.

The hydrocarbon-based electrolyte specifically includes sulfonated polyether sulfon (S-PES), sulfonated polyaryl ether ketone, sulfonated polybenzimidazole alkyl, phosphonated polybenzimidazole alkyl, sulfonated polystyrene, sulfonated polyether ether ketone (SPEEK), sulfonated polyphenylene (S-PPP), and the like.

The above-mentioned ion exchange resins may be used singly in only one kind or in combinations of two or more kinds. Also, the above-mentioned materials are not exclusive, and other materials can be used as well.

The conductivity of protons is important in the polymer electrolyte which is responsible for proton transfer. Here, in a case where EW of the polymer electrolyte is too large, ion conductivity of the whole catalyst layer deteriorates. Accordingly, the catalyst layer of this embodiment preferably contains the polymer electrolyte with small EW. Specifically, the catalyst layer of this embodiment contains preferably a polymer electrolyte with EW of 1500 g/eq. or less, more preferably a polymer electrolyte with EW of 1200 g/eq. or less, and particularly preferably a polymer electrolyte with EW of 1000 g/eq. or less.

Meanwhile, in a case where EW is too small, the hydrophillicity is so high that smooth movement of water becomes difficult. From this point of view, EW of a polymer electrolyte is preferably 600 g/eq or more. Meanwhile, EW (Equivalent Weight) represents the equivalent weight of an exchange group with proton conductivity. The equivalent weight is dry weight of an ion exchange membrane per equivalent of the ion exchange group, and represented by a unit of "g/eq".

In addition, the catalyst layer contains two or more kinds of polymer electrolytes with different EW in the power generation surface, and it is preferable to use a polymer electrolyte with a lowest EW among polymer electrolytes in a region in which a relative humidity of gas in a passage is 90% or less. By adopting such material arrangement, the resistance value becomes small, irrespective of the current density region, and cell performance can be improved. EW of the polymer electrolyte used in a region in which a relative humidity of gas in a passage is 90% or less, that is, the polymer electrolyte with a lowest EW is preferably 900 g/eq. or less. Accordingly, the above-mentioned effects are more secured and remarkable.

Furthermore, it is desirable to use the polymer electrolyte with a lowest EW in a region with a temperature higher than the average temperature of the inlet and outlet of cooling water. Accordingly, the resistance value becomes small, irrespective of the current density region, and cell performance can be further improved.

Furthermore, it is desirable to use the polymer electrolyte with a lowest EW in a region within the range of ⅗ from at least one of gas supply ports of fuel gas and oxidant gas, with respect to the passage length, from the viewpoint of reducing the resistance value of fuel cell system.

The catalyst layer may contain an additive such as a water-repellent agent such as polytetrafluoroethylene, polyhexafluoropropylene or tetrafluoroethylene-hexafluoropropylene copolymer, a dispersing agent such as a surfactant, a thickener such as glycerin, ethylene glycol (EG), polyvinyl alcohol (PVA) or propylene glycol (PG), and a pore-forming material, as necessary.

The thickness of the catalyst layer (dry film thickness) is preferably 0.05 to 30 μm, more preferably 1 to 20 μm, and further preferably 2 to 15 μm. Meanwhile, the above thickness is applied to both the cathode catalyst layer and the anode catalyst layer. However, the thicknesses of the cathode catalyst layer and the anode catalyst layer may be the same or different from each other.

(Method for Producing Catalyst)

Preferable method for producing catalyst of this embodiments will be described below.

The method for producing the catalyst is not particularly limited, but it is preferable that a catalytic metal is supported on a catalyst carrier and then subjected to a treatment with an oxidative treatment solution. Namely, the method for producing the fuel cell electrode catalyst of this embodiment preferably has supporting a catalytic metal containing platinum on a catalyst carrier precursor to obtain a catalyst powder and treating the catalyst powder with an oxidative treatment solution to obtain the catalyst.

1. Step of Supporting a Catalytic Metal Containing Platinum on a Catalyst Carrier Precursor to Obtain a Catalyst Powder The catalyst carrier precursor is preferably obtained by a heat treatment of a carbon material. According to a heat treatment, a catalyst carrier precursor having R' value (D'/G intensity ratio) of 0.6 or less can be obtained.

The BET specific surface area of a carbon material is not particularly limited, but is preferably 900 $m^2/g$ or more, more preferably 1000 to 3000 $m^2/g$, even more preferably 1100 to 1800 $m^2/g$, and particularly preferably 1200 to 1800 $m^2/g$ in order for the BET specific surface area of the catalyst to satisfy the above constitution (III). In the case of the specific surface area as described above, a sufficient gas transportability (lower gas transport resistance) and performance (supporting a sufficient amount of the catalytic metal) can be achieved. In addition, by using a carrier with large BET specific surface area in particular, more efficient supporting (storing) of the catalytic metal inside a carrier (in particular, mesopore) can be achieved.

It is preferable that the carbon material satisfies at least one of the following constitutions (1) to (3). (1) (a-1) it has pores with a radius of less than 1 nm (primary pore) and pores with a radius of 1 nm or more (primary pore); and (a-2) a pore volume of the pores with a radius of less than 1 nm is 0.3 cc/g carrier or more. (2) (a-1) it has pores with a radius of less than 1 nm and pores with a radius of 1 nm or more; and (c-1) the mode radius of pore distribution of the pores with a radius of less than 1 nm is 0.3 nm or more and less than 1 nm. (3) (d-1) the mode radius of pore distribution of the pores with a radius of 1 nm or more is 1 nm or more and less than 5 nm; and (d-4) a pore volume of the pores with a radius of 1 nm or more and less than 5 nm is 0.4 cc/g carrier or more. Furthermore, in (3), it is preferable that (b-2) a pore volume of the pores with a radius of 1 nm or more and less than 5 nm is 0.8 cc/g carrier or more. More preferred range of the pore volume of micropores in (a-2), mode radius of pore distribution of micropores in (c-1), mode radius of pore distribution of pores with a radius of 1 nm or more in (d-1), pore volume of the pores with a radius of 1 nm or more and less than 5 nm in (d-4) and the like are the same as those described in the sections of the catalysts (a) to (d).

The carbon material is produced by a method described in the publications such as JP 2010-208887 A or WO 2009/75264 A. The conditions of the heat treatment for obtaining a carbon material having desired pores are different depending on the material, and are properly determined so as to obtain a desired porous structure. Generally, the high heating temperature brings a tendency for a mode size of the pore distribution to shift toward the direction of a large pore diameter. Therefore, such heat treatment conditions may be determined in accordance with the material while confirming the porous structure and it can be easily determined by a person skilled in the art.

The material of the carbon material is not particularly limited, as long as it contains carbon as a main component. However, a material allowing easy formation of a catalyst carrier satisfying the aforementioned R' value or the aforementioned BET specific surface area is preferable. In addition, the material that can form pores having pore volume or mode size (primary pores) inside the carrier and has sufficient specific surface area and sufficient electron conductivity for supporting the catalyst component inside the mesopores in a dispersion state is preferable. Specifically, examples include carbon powder made of carbon black (such as ketjen black, oil furnace black, channel black, lamp black, thermal black and acetylene black), and activated carbon. The phrase "the main component is carbon" indicates that carbon atoms are contained as the main component, and is a concept including both "consisting only of carbon atoms" and "consisting substantially of carbon atoms", and elements except carbon atoms may be contained. The phrase "consisting substantially of carbon atoms" indicates that the mixing of approximately 2 to 3% by weight or less of impurities is allowable.

Furthermore, the average particle size (average secondary particle size) of the carbon material is not particularly limited, but it is preferably 20 to 100 nm. From the viewpoint of easy supporting, catalyst use rate, or the like, the average particle size (average primary particle size) of the carbon material is 1 to 10 nm, and preferably 2 to 5 nm. When it is within this range, mechanical strength is maintained even when the aforementioned pore structure is formed on the carrier, and the catalyst layer can be controlled within a suitable range. As for the value of the "average particle size of a carbon material", unless specifically described otherwise, a value which is measured by use of an observational means such as a scanning electron microscope (SEM) and a transmission electron microscope (TEM), and is calculated as an average value of particle size of the particles observed in several to several tens of visual fields is used. Similarly, the "particle size (diameter)" means, among the lengths of a line going through a center of a particle connecting any two points on a particle contour, the longest length.

The conditions for a heat treatment of a carbon material are not particularly limited, but the treatment is performed so as to obtain a catalyst carrier precursor satisfying the above constitution (II) (R' value (D'/G intensity ratio) is 0.6 or less) and the constitution (III) (BET specific surface area is at least 900 m$^2$/g). Specifically, the heat treatment temperature is preferably 1300° C. or more and 1880° C. or less, more preferably 1380 to 1880° C., and even more preferably 1400 to 1860° C. For the heat treatment, the temperature increase rate is preferably 100 to 1000° C./hour and is particularly preferably 300 to 800° C./hour. The heat treatment time (retention time at a predetermined heat treatment temperature) is preferably 1 to 10 minutes, and particularly preferably 2 to 8 minutes. The heat treatment can be performed in an air atmosphere, or an inert atmosphere such as argon gas or a nitrogen gas. In such conditions, carbon powder for satisfying the above R' value as the constitution (II), or the R' value of the constitution (II) and the specific surface area of the constitution (III) is conveniently obtained. In addition, with the above conditions, carbon powder satisfying the R value of the constitution (II') is also conveniently obtained. Meanwhile, when the heat treatment conditions are less than the above lower limit (heat treatment conditions are too mild), there is a possibility that the edge amount of carbon (graphene) is not sufficiently lowered. On the other hands, when the heat treatment conditions are more than the above upper limit (heat treatment conditions are too severe), there is a possibility that graphitization proceeds too much, and the BET specific surface area of carbon (graphene) becomes too small.

The resultant obtained by a heat treatment of the carbon material corresponds to a catalyst carrier precursor.

Even when the oxidation treatment and the treatment for supporting a catalytic metal that are described below are performed, the R' value of the catalyst is substantially the same as the R' value of the catalyst carrier precursor. As such, in order for the catalyst to satisfy the condition of the above (II) (D'/G intensity ratio is 0.6 or less), it is preferable that the catalyst carrier precursor also satisfies the above (II). Namely, the catalyst carrier precursor which is used for obtaining the catalyst used in the catalyst layer of this embodiment satisfies the following: R' (D'/G intensity ratio), which is the ratio of D' band peak intensity (D' intensity) measured in the vicinity of 1620 cm$^{-1}$ relative to G band peak intensity (G intensity) measured in the vicinity of 1580 cm$^{-1}$ by Raman spectroscopy, is 0.6 or less. The R' (D'/G intensity ratio) of the catalyst carrier precursor is preferably 0 to 0.6 and more preferably 0 to 0.51.

In addition to above, even when the oxidation treatment and the treatment for supporting a catalytic metal that are described below are performed, the R value of the catalyst is substantially the same as the R value of the catalyst carrier precursor. As such, in order for the catalyst to satisfy the condition of the above (II'), it is preferable that the catalyst carrier precursor also satisfies that (II') R (D/G intensity ratio), which is the ratio of D intensity relative to G intensity, is 1.7 or more. Furthermore, the R (D/G intensity ratio) of the catalyst carrier precursor is more preferably more than 1.75 and 2.5 or less, and even more preferably 1.8 to 2.4.

Furthermore, when the catalyst satisfies the above condition (III), it is preferable that (III) the BET specific surface area of the catalyst carrier precursor is also 900 m$^2$/g or more per weight. That is because, the specific surface area of the catalyst carrier remains the same even when the oxidation treatment and the treatment for supporting a catalytic metal that are described below are performed and most of the specific surface area of a catalyst belongs to the catalyst carrier. Thus, the BET specific surface area of the catalyst carrier precursor is more preferably 1000 m$^2$/g or more, even more preferably 1000 to 3000 m$^2$/g carrier, and particularly preferably 1100 to 1800 m$^2$/g carrier. In the case of the specific surface area as described above, sufficient mesopores and also, in some cases, sufficient micropores can be secured, and thus more catalytic metal can be stored (supported) in the mesopores with better dispersibility. Also, mesopores and also micropores in some cases sufficient for gas transport can be secured, thus gas transport resistance can be further reduced. In addition, the electrolyte and the catalytic metal in the catalyst layer can be physically separated (contact between the electrolyte and the catalytic metal can be more effectively suppressed and prevented). Therefore, the activity of the catalytic metal can be more effectively utilized. Moreover, local flux in the vicinity of the catalytic metal particles becomes small, thus a reaction gas is rapidly transported, and the catalytic metal is effectively utilized. Also, by the presence of many pores (mesopores) and micropores in some cases, the catalytic reaction can be more effectively promoted. Also, the balance between dispersibility of the catalyst component on the catalyst carrier and effective utilization rate of the catalyst component can be properly controlled. In addition, the micropores act as a transport path of gas, and three-phase interfaces are more remarkably formed by water, thus catalytic activity can be further improved.

Subsequently, a catalytic metal is supported on the catalyst carrier precursor to obtain a catalyst powder.

The method for supporting the catalytic metal on the catalyst carrier precursor is not particularly limited. Preferably, the method includes (i) a step of precipitating a catalytic metal on the surface of the catalyst carrier (precipitation step) and (ii) a step of performing a heat treatment, after the precipitation step, to increase the particle size of the catalytic metal (heat treatment step). The above method increases the particle size of the catalytic metal by performing a heat treatment after precipitation. Therefore, a catalytic metal with a large particle size can be supported inside the pores (especially mesopores) of the catalyst carrier.

A preferred embodiment of the method for producing the catalyst will be described below, but the present invention is not limited to the following embodiment.

(i) Deposition Step

In this step, the catalyst metal is deposited on the surface of the catalytic carrier precursor. This step is a known method, and for example, a method of immersing a catalyst carrier precursor in a precursor solution of the catalytic metal, followed by reducing is preferably used.

The precursor of the catalytic metal is not particularly limited, and properly selected depending on the kind of the catalytic metal to be used. Specifically, chlorides, nitrates, sulfates, chlorides, acetates and amine compounds of the catalytic metal such as above-mentioned platinum and the like can be exemplified. More specifically, chlorides such as platinum chloride (hexachloroplatinate hexahydrate), palladium chloride, rhodium chloride, ruthenium chloride and cobalt chloride, nitrates such as palladium nitrate, rhodium nitrate and iridium nitrate, sulfates such as palladium sulfate and rhodium sulfate, acetates such as rhodium acetate, ammine compounds such as dinitrodiammine platinum nitric acid and dinitrodiammine palladium and the like are preferably exemplified. Also, the solvent used to prepare the precursor solution of the catalytic metal is not particularly limited so long as it can dissolve the precursor of the catalytic metal, and it is properly selected depending on the kind of the precursor of the catalytic metal to be used. Specific examples include water, acids, alkalis, organic solvents and the like. The concentration of the precursor of the catalytic metal in the precursor solution of the catalytic metal is not particularly limited, and is preferably 0.1 to 50% by weight and more preferably 0.5 to 20% by weight, when converted in terms of metal.

The reducing agent includes hydrogen, hydrazine, sodium thiosulfate, citric acid, sodium citrate, L-ascorbic acid, sodium borohydride, formaldehyde, methanol, ethanol, ethylene, carbon monoxide, and the like. A gaseous substance at normal temperature such as hydrogen can also be supplied by bubbling. The amount of the reducing agent is not particularly limited so long as it is the amount that can reduce the precursor of the catalytic metal to a catalytic metal, and the known amount is similarly applicable.

The deposition conditions are not particularly limited so long as the catalytic metal can be deposited on a catalyst carrier precursor. For example, the deposition temperature is preferably a temperature around the boiling point of the solvent, and more preferably a room temperature to 100° C. Also, the deposition time is preferably 1 to 10 hours and more preferably 2 to 8 hours. The precipitation step may be performed while stirring and mixing, as necessary.

Accordingly, the precursor of the catalytic metal is reduced to a catalytic metal, and the catalytic metal is deposited (supported) on the catalyst carrier precursor.

(ii) Heat Treatment Step

In this step, after the (i) deposition step, a heat treatment is performed to increase the particle size of the catalytic metal.

The heat treatment condition is not particularly limited so long as it is the condition that can increase the particle size of the catalytic metal. For example, the heat treatment temperature is preferably 300 to 1200° C., more preferably 500 to 1150° C., and particularly preferably 700 to 1000° C. Also, the heat treatment time is preferably 0.02 to 3 hours, more preferably 0.1 to 2 hours, and particularly preferably 0.2 to 1.5 hours. The heat treatment step may be performed in a hydrogen atmosphere.

Accordingly, the particle size of the catalytic metal can be increased in the catalyst carrier precursor (especially, in the mesopores of the catalyst carrier precursor). Therefore, the catalytic metal particles are hard to desorb (from the catalyst carrier) to the outside of the system. Therefore, the catalyst can be more effectively utilized.

2. Step of Treating a Catalyst Powder with Oxidative Treatment Solution to Obtain a Catalyst Subsequently, a catalyst powder is obtained by supporting a catalytic metal containing platinum, and the catalyst powder is preferably treated with an oxidative treatment solution.

According to a treatment with an oxidative solution, the carrier can be provided with an acidic group so that the hydrophillicity of a carrier can be improved. Accordingly, the catalyst satisfying the above condition (I) in which the volume ratio of a water vapor adsorption amount compared to a nitrogen adsorption amount is 0.15 or more and 0.30 or less can be easily obtained.

Preferred examples of the oxidative solution which is used include an aqueous solution of sulfuric acid, nitric acid, phosphite acid, potassium permanganate, hydrogen peroxide, hydrochloric acid, chloric acid, hypochlorous acid, chromic acid, or the like. Meanwhile, the treatment with an oxidative solution is performed by contacting, one or more times, the catalyst with an oxidative solution. When an acid treatment is performed several times, the type of the solution can be varied for each treatment. As for the condition for treatment with an oxidative solution, the solution concentration is preferably 0.1 to 10.0 mol/L and the catalyst is preferably immersed in the solution. The time for immersion is preferably 0.5 to 3 hours. The treatment temperature is preferably 50 to 90° C. The volume ratio of a water vapor adsorption amount compared to a nitrogen adsorption amount or the amount of an acidic group in the carrier can be controlled by adjusting the BET specific surface area of a catalyst, type of an oxidative solution, treatment time, and treatment temperature.

(Method for Producing Catalyst Layer)

The method for producing the catalyst layer using the above obtained catalyst is not particularly limited, and for example, the known methods such as the method described in JP 2010-21060 A are applied, or properly modified and applied.

Preferably, the method includes a step for producing a catalyst layer of the following 3. using a catalyst obtained by the above mentioned 1. and 2.

3. Step of Preparing the Catalyst Layer

Subsequently, a catalyst ink containing the catalyst obtained above, a polymer electrolyte and a solvent is prepared. The solvent is not particularly limited, and the normal solvent used in forming a catalyst layer can be similarly used. Specific examples include water, cyclohexanol, lower alcohols with a carbon number of 1 to 4, propylene glycol, benzene, toluene, xylene and the like. Other than these, acetic acid butyl alcohol, dimethyl ether, ethylene glycol and the like may be used as a solvent. These solvents may be used singly in one kind or in mixed liquid of two or more kinds.

Among them, a water-alcohol mixed solvent with a high content ratio of water is preferably used as the solvent. It is preferable to use a mixed solvent with a high content ratio of water as a dispersion medium, because it can prevent electrolyte from coating the entrance of mesopores. Here, a mixed weight ratio of water and alcohol (water/alcohol) is preferably 55/45 to 95/5, and more preferably 60/40 or more and less than 91/9, and even more preferably 65/35 to 90/10.

Water is not particularly limited, and tap water, pure water, ion-exchange water, distilled water and the like can be used. Also, alcohol is not particularly limited. Specific examples include methanol, ethanol, 1-propanol, 2-propanol, 1-butanol, 2-methyl-1-propanol, 2-butanol, 2-methyl-2-propanol, cyclohexanol, and the like. Among them, methanol, ethanol, 1-propanol, 2-propanol, 1-butanol, 2-methyl-1-propanol, 2-butanol and 2-methyl-2-propanol are preferable. By using such high affinity lower alcohol, extremely uneven distribution of the electrolyte can be prevented. Furthermore, among the above alcohols, alcohol with boiling point of lower than 100° C. is preferably used. Examples of the alcohol with boiling point of lower than 100° C. include alcohol selected from a group consisting of methanol (boiling point: 65° C.), ethanol (boiling point: 78° C.), 1-propanol (boiling point: 97° C.), 2-propanol (boiling point: 82° C.), and 2-methyl-2-propanol (boiling point: 83° C.). The alcohol can be used singly in only one kind or in a mixture of two or more kinds.

As described above, the polymer electrolyte is roughly classified into a fluorine-based polymer electrolyte and a hydrocarbon-based polymer electrolyte, depending on the kind of ion exchange resin which is a constituent material. Among them, the electrolyte is preferably a fluorine-based polymer electrolyte. By using a hydrophobic fluorine-based polymer electrolyte as described above, the electrolyte is further likely to agglomerate with increasing water content in the solvent.

The amount of the solvent constituting the catalyst ink is not particularly limited so long as it is an amount such as to allow the electrolyte to be completely dissolved. Specifically, the concentration of the solid matter containing the catalyst powder, the polymer electrolyte and the like is preferably 1 to 50% by weight and more preferably about 5 to 30% by weight in the electrode catalyst ink.

Meanwhile, in the case of using additives such as water-repellent agent, dispersing agent, thickener and pore-forming material, these additives may be added to the catalyst ink. In this case, the addition amount of the additives is not particularly limited so long as it is an amount such as not to disturb the above effect of the present invention. For example, the addition amount of each of the additives is preferably 5 to 20% by weight, with respect to the whole weight of the electrode catalyst ink.

Next, the catalyst ink is applied on the surface of a substrate. An application method on the substrate is not particularly limited and known methods can be used. Specifically, the application can be performed using a known method such as spray (spray coating) method, Gulliver printing method, die coater method, screen printing method, and doctor blade method.

On this occasion, a solid polymer electrolyte membrane (an electrolyte layer) or a gas diffusion substrate (a gas diffusion layer) can be used as the substrate onto which the catalyst ink is applied. In such a case, after forming the catalyst layer on the surface of a solid polymer electrolyte membrane (an electrolyte membrane) or a gas diffusion substrate (a gas diffusion layer), an obtained laminated body may be directly used for producing a membrane electrode assembly. Alternatively, the catalyst layer may be obtained by forming the catalyst layer on the substrate which is a peelable substrate such as polytetrafluoroethylene (PTFE) [Teflon (registered trademark)] sheet, and then peeling the catalyst layer portion off the substrate.

Lastly, a coated layer (membrane) of the catalyst ink is dried under the room atmosphere or an inert gas atmosphere at room temperature to 150° C. for 1 to 60 minutes. Thus, the catalyst layer is formed.

[Membrane Electrode Assembly]

According to further another embodiment of the present invention, a membrane electrode assembly for fuel cell containing the above electrode catalyst for fuel cell or the above electrode catalyst layer for fuel cell is provided. Namely, a fuel cell membrane electrode assembly having a solid polymer electrolyte membrane 2, a cathode catalyst layer arranged on one side of the electrolyte membrane, an anode catalyst layer arranged on the other side of the electrolyte membrane, and a pair of gas diffusion layers (4a and 4c) which sandwich the electrolyte membrane 2, the anode catalyst layer 3a and the cathode catalyst layer 3c is provided. Then, in this membrane electrode assembly, at least one of the cathode catalyst layer and the anode catalyst layer is the catalyst layer of the embodiment described above.

However, in consideration of the necessity for the improvement in proton conductivity and the improvement in the transport property (the gas diffusion property) of reactant gas (especially $O_2$), at least the cathode catalyst layer is preferably the catalyst layer of the embodiment described above. However, the catalyst layer according to the above-mentioned embodiment is not particularly limited; for example, the catalyst layer may be used as the anode catalyst layer, or as both the cathode catalyst layer and the anode catalyst layer.

According to further another embodiment of the present invention, a fuel cell having the membrane electrode assembly of the above-mentioned embodiment is provided. Namely, an embodiment of the present invention is a fuel cell having a pair of an anode separator and a cathode separator which sandwich the membrane electrode assembly of the above-mentioned embodiment.

The constituents of the PEFC 1 using the catalyst layer according to the above-mentioned embodiment will be described below with reference to FIG. 1. However, the characteristics of the present invention lie in the catalyst layer. Therefore, the specific constitutions of members except the catalyst layer constituting the fuel cell may be properly modified with reference to the conventionally known knowledge.

(Electrolyte Membrane)

The electrolyte membrane consists of, for example, a solid polymer electrolyte membrane 2 such as can be seen in the constitution illustrated in FIG. 1. This solid polymer electrolyte membrane 2 has the function of allowing the protons generated in an anode catalyst layer 3a to be selectively transmitted to a cathode catalyst layer 3c along the membrane thickness direction during the operation of a PEFC 1. Also, the solid polymer electrolyte membrane 2 serves as a partition wall to prevent the fuel gas supplied to the anode side from mixing with the oxidant gas supplied to the cathode side.

An electrolyte material composing the solid polymer electrolyte membrane 2 is not particularly limited, and can be properly referred to the conventionally known knowledge. For example, the fluorine-based polymer electrolyte and the hydrocarbon-based polymer electrolyte, which are described as the polymer electrolyte in the above, may be used. On this occasion, it is not necessary to use the same as the polymer electrolyte used for the catalyst layer.

The thickness of the electrolyte membrane may be properly determined in consideration of the characteristics of the obtained fuel cell, and is not particularly limited. The thickness of the electrolyte membrane is ordinarily approximately 5 to 300 μm. The balance between the strength during the manufacturing process of the membrane, the durability during usage, and output performance during use can be properly controlled, when the thickness of the electrolyte membrane is within such a range.

(Gas Diffusion Layer)

The gas diffusion layers (the anode gas diffusion layer $4a$ and the cathode gas diffusion layer $4c$) have the function of promoting the diffusion of the gas (the fuel gas or the oxidant gas) supplied through the gas passages ($6a$ and $6c$) of the separator to the catalyst layers ($3a$ and $3c$), as well as the function as the electronic conduction path.

A material composing a substrate of the gas diffusion layers ($4a$ and $4c$) is not particularly limited, and can be properly referred to the conventionally known knowledge. Examples thereof include sheet-like materials with conductivity and porosity, such as fabrics made of carbon, paper-like paper-making material, felt and unwoven fabric. The thickness of the substrate may be properly determined in consideration of the characteristics of the obtained gas diffusion layer, and it may be approximately 30 to 500 μm. When the thickness of the substrate is a value within such a range, the balance between the mechanical strength and the diffusivity of gas, water and the like can be properly controlled.

The gas diffusion layer preferably contains water-repellent agent with the aim of enhancing water repellency to prevent a flooding phenomenon and the like. Examples of the water-repellent agents include, but not particularly limited to, fluorine-based polymer materials such as polytetrafluoroethylene (PTFE), polyfluorovinylidene (PVdF), polyhexafluoropropylene and tetrafluoroethylene-hexafluoropropylene copolymer (FEP), as well as polypropylene and polyethylene.

Also, in order to further improve water repellency, the gas diffusion layer may be such as to have a carbon particle layer comprising an aggregate of carbon particles containing the water-repellent agent (a microporous layer; MPL, not shown in the drawings) on the catalyst layer side of the substrate.

The carbon particles contained in the carbon particle layer are not particularly limited, and conventionally known materials such as carbon black, graphite and expanded graphite may be properly adopted. Among them, carbon black such as oil furnace black, channel black, lamp black, thermal black and acetylene black may be preferably used by reason of having excellent electron conductivity and large specific surface area. The average particle size of the carbon particles is preferably approximately 10 to 100 nm. Thus, high drainage by capillary force is obtained, and the contact with the catalyst layer also can be improved.

Examples of the water-repellent agent used for the carbon particle layer include the same as the above-mentioned water-repellent agent. Above all, the fluorine-based polymer materials may be preferably used by reason of being excellent in water repellency and corrosion resistance during the electrode reaction.

The mixing ratio between the carbon particles and the water-repellent agent in the carbon particle layer should be approximately 90:10 to 40:60 at weight ratio (carbon particles:water-repellent agent) in consideration of the balance between the water repellency and the electron conductivity. Incidentally, also the thickness of the carbon particle layer is not particularly limited and may be properly determined in consideration of the water repellency of the obtained gas diffusion layer.

(Method for Producing Membrane Electrode Assembly)

The method for producing the membrane electrode assembly is not particularly limited, and a conventionally known method can be used. For example, it is possible to use the method of transferring by means of a hot press or coating the catalyst layer on the solid polymer electrolyte membrane, drying it, and joining the gas diffusion layer to it, or the method of preparing two gas diffusion electrodes (GDE) by previously coating the catalyst layer on one side of the microporous layer side of the gas diffusion layer (or the substrate layer when the microporous layer is not included) and drying it, and joining these gas diffusion electrodes to both sides of the solid polymer electrolyte membrane by means of a hot press. The coating and assembly conditions of the hot press and the like may be properly adjusted, depending on the kinds (perfluorosulfonic acid-based and hydrocarbon-based) of the solid polymer electrolyte membrane and the polymer electrolyte in the catalyst layer.

(Separator)

The separator has the function of electrically connecting each cell in series when configuring the fuel cell stack by connecting in series a plurality of single cells of the fuel cell such as a polymer electrolyte fuel cell. Also, the separator has the function of serving as a partition wall for separating fuel gas, oxidant gas and refrigerant from each other. In order to secure the passages for them, as described above, a gas passage and a refrigerating passage are preferably provided on each of the separators. As the material for composing the separators, conventionally known materials, for example, carbon such as dense carbon graphite and carbon plate, or metals such as stainless steel can be properly adopted without any limitation. The thickness and size of the separators, and the shape and size of each passage to be provided are not particularly limited, and may be properly determined in consideration of the desired output performance of the obtained fuel cell.

Moreover, in order for the fuel cell to be able to generate a desired voltage, a fuel cell stack, which has a structure such as to connect in series a plurality of layers of membrane electrode assemblies through the separators, may be formed. The shape of the fuel cell is not particularly limited, and may be properly determined so as to obtain battery characteristics such as the desired voltage.

The above-mentioned PEFC and membrane electrode assembly use the catalyst layer excellent in power generation performance and durability. Accordingly, the PEFC and the membrane electrode assembly are excellent in power generation performance and durability.

The PEFC according to the present embodiment and the fuel cell stack using the same can be, for example, mounted on a motor vehicle as a drive power source.

EXAMPLES

The effect of the present invention will be described by using the following examples and comparative examples. However, the technical scope of the present invention should not be construed to be limited to the following examples. Meanwhile, in the following examples, the operations are performed at room temperature (25° C.) unless it is specifically described otherwise. Furthermore, "%" and "parts" indicate "% by weight" and "parts by weight", respectively, unless specifically described otherwise.

Reference Example 1

A carbon material A was prepared, according to the method described in WO 2009/75264 A. As for the carbon material A obtained as above, pore volumes of micropores and mesopores, mode diameters of micropores and mesopores and BET specific surface area were measured. As a result, the pore volume of micropores was 1.04 cc/g, the pore volume of mesopores was 0.92 cc/g, the mode diameter of micropores was 0.65 nm, the mode diameter of mesopores was 1.2 nm, and the BET specific surface area was 1770 m$^2$/g.

A carrier A (catalyst carrier precursor) with an average particle size of 100 nm was prepared by heating the obtained carbon material A to 1850° C. at a temperature increase rate of 500° C./hour in an argon atmosphere, and then maintaining it at the same temperature for 5 minutes.

As a result of measuring the R value and R' value of the carrier A, they were found to be 2.15 and 0.35, respectively.

As for the carrier A obtained as above, pore volumes of micropores and mesopores, mode diameters of micropores and mesopores and BET specific surface area were measured. As a result, the pore volume of micropores was 0.61 cc/g, the pore volume of mesopores was 0.68 cc/g, the mode diameter of micropores was 0.75 nm, the mode diameter of mesopores was 1.2 nm, and the BET specific surface area was 1226 m$^2$/g.

The carrier A was used and platinum (Pt) with an average particle size of 3.3 nm was supported as a catalytic metal on this carrier A so that the carrying rate was 30% by weight to obtain a catalyst powder A. Namely, 46 g of the carrier A was immersed in 1000 g of a dinitrodiammine platinum nitric acid solution with a platinum concentration of 4.6% by weight (platinum content: 46 g) and the mixture was stirred, then 100 ml of 100% ethanol was added as a reducing agent. This solution was stirred and mixed at the boiling point for 7 hours, and platinum was supported on the carrier A. Then, the mixture was filtered and dried to obtain a catalyst powder with a carrying rate of 30% by weight. Thereafter, the catalyst powder was maintained in a hydrogen atmosphere at a temperature of 900° C. for 1 hour, to obtain a catalyst powder A with an average particle size of 100 nm. As a result of measuring the R value and R' value of this catalyst powder A, they were found to be 2.15 and 0.35, respectively.

As for the catalyst powder A obtained as above, pore volumes of micropores and mesopores, mode diameters of micropores and mesopores and BET specific surface area were measured. As a result, the pore volume of micropores was 0.65 cc/g carrier, the pore volume of mesopores was 0.48 cc/g carrier, the mode diameter of micropores was 0.75 nm, the mode diameter of mesopores was 1.20 nm, and the BET specific surface area was 1115 m$^2$/g. Also, the BET specific surface area of the carrier in the catalyst powder A is 1226 m$^2$/g carrier.

Furthermore, in the catalyst powder A, the volume ratio of a water vapor adsorption amount compared to a nitrogen adsorption amount at a relative pressure of 0.5 in adsorption isotherm was 0.080.

Reference Example 2

A carrier B (catalyst carrier precursor) with a BET specific surface area of 1378 m$^2$/g was prepared by heating the carbon material A obtained from Reference Example 1 to 1700° C. at a temperature increase rate of 500° C./hour in an argon atmosphere, and then maintaining it at the same temperature for 5 minutes.

As a result of measuring the R value and R' value of the carrier B, they were found to be 1.99 and 0.42, respectively.

Furthermore, as for the carrier B obtained as above, average particle size (diameter), pore volumes of micropores and mesopores, mode diameters of micropores and mesopores and BET specific surface area were measured. As a result, the average particle size (diameter) was 91.5 nm, the pore volume of micropores was 0.43 cc/g carrier, the pore volume of mesopores was 0.69 cc/g carrier, the mode diameter of micropores was 0.66 nm, the mode diameter of mesopores was 2.8 nm, and the BET specific surface area was 1378 m$^2$/g for the carrier B.

Catalyst powder was prepared in the same manner as Reference Example 1 by using the carrier B, and a catalyst powder B having average particle size of 105 nm was obtained. As a result of measuring the R value and R' value of the catalyst powder B, they were found to be 1.99 and 0.42, respectively.

As for the catalyst powder B obtained as above, pore volumes of micropores and mesopores, mode diameters of micropores and mesopores and BET specific surface area were measured. As a result, the pore volume of micropores was 0.74 cc/g carrier, the pore volume of mesopores was 0.52 cc/g carrier, the mode diameter of micropores was 0.72 nm, the mode diameter of mesopores was 1.66 nm, and the BET specific surface area was 1234 m$^2$/g.

Reference Example 3

A carrier C (catalyst carrier precursor) with a BET specific surface area of 1522 m$^2$/g was prepared by heating the carbon material A which has been obtained in Reference Example 1 to 1600° C. at a temperature increase rate of 500° C./hour in an argon atmosphere, and then maintaining it at the same temperature for 5 minutes.

As a result of measuring the R value and R' value of the carrier C, they were found to be 1.81 and 0.50, respectively.

Furthermore, as for the carrier C obtained as above, average particle size (diameter), pore volumes of micropores and mesopores, mode diameters of micropores and mesopores and BET specific surface area were measured. As a result, the average particle size (diameter) was 89 nm, the pore volume of micropores was 0.73 cc/g carrier, the pore volume of mesopores was 1.17 cc/g carrier, the mode diameter of micropores was 0.73 nm, the mode diameter of mesopores was 2.4 nm, and the BET specific surface area was 1522 m$^2$/g for the carrier C.

Catalyst powder was prepared in the same manner as Reference Example 1 by using the carrier C and a catalyst powder C having average particle size of 90 nm was obtained. As a result of measuring the R value and R' value of the catalyst powder C, they were found to be 1.81 and 0.50, respectively.

As for the catalyst powder C obtained as above, pore volumes of micropores and mesopores, mode diameters of micropores and mesopores and BET specific surface area were measured. As a result, the pore volume of micropores was 0.84 cc/g carrier, the pore volume of mesopores was 1.1 cc/g carrier, the mode diameter of micropores was 0.71 nm, the mode diameter of mesopores was 1.66 nm, and the BET specific surface area of the catalyst carrier was 1522 m$^2$/g.

Reference Example 4

As a result of measuring the R value and R' value of the carrier D in which the carbon material A obtained from Reference Example 1 is used, they were found to be 1.64 and 0.61, respectively. Furthermore, as for the carrier D obtained accordingly, average particle size (diameter), pore volumes of micropores and mesopores, mode diameters of micropores and mesopores and BET specific surface area were measured. As a result, the average particle size (diameter) was 91.5 nm, the pore volume of micropores was 1.04 cc/g carrier, the pore volume of mesopores was 1.23 cc/g carrier, the mode diameter of micropores was 0.65 nm, the mode diameter of mesopores was 2.1 nm, and the BET specific surface area was 1768 $m^2/g$ for the carrier D.

Catalyst powder was prepared in the same manner as Reference Example 1 by using the carrier D and a catalyst powder D was obtained. As a result of measuring the R value and R' value of the catalyst powder D, they were found to be 1.64 and 0.61, respectively.

Reference Example 5

A carrier E was prepared by heating the carbon material A which has been obtained in Reference Example 1 to 1300° C. at a temperature increase rate of 500° C./hour in an argon atmosphere, and then maintaining it at the same temperature for 5 minutes. As a result of measuring the R value and R' value of the carrier E, they were found to be 1.75 and 0.66, respectively. Furthermore, as for the carrier E obtained accordingly, average particle size (diameter), pore volumes of micropores and mesopores, mode diameters of micropores and mesopores and BET specific surface area were measured. As a result, the average particle size (diameter) was 91.5 nm, the pore volume of micropores was 1.06 cc/g carrier, the pore volume of mesopores was 1.21 cc/g carrier, the mode diameter of micropores was 0.66 nm, the mode diameter of mesopores was 2.1 nm, and the BET specific surface area was 1768 $m^2/g$ for the carrier E.

Catalyst powder was prepared in the same manner as Reference Example 1 by using the carrier E and a catalyst powder E was obtained. As a result of measuring the R value and R' value of the catalyst powder E, they were found to be 1.75 and 0.66, respectively.

In the catalyst powder E, the volume ratio of a water vapor adsorption amount compared to a nitrogen adsorption amount at a relative pressure of 0.5 in adsorption isotherm was 8.4.

Reference Example 6

Ketjen black (EC300J) (BET specific surface area of 715 $m^2/g$) was used as a carrier F. As a result of measuring the R value and R' value of the carrier F, they were found to be 1.78 and 0.74, respectively. Furthermore, as for the carrier F obtained as above, the average particle size (diameter), pore volumes of micropores and mesopores, mode diameters of micropores and mesopores and BET specific surface area were measured. As a result, the average particle size (diameter) was 53 nm, the pore volume of micropores was 0.35 cc/g carrier, the pore volume of mesopores was 0.49 cc/g carrier, the mode diameter of micropores was 0.45 nm, the mode diameter of mesopores was 2.2 nm, and the BET specific surface area was 715 $m^2/g$ for the carrier F.

Catalyst powder was prepared in the same manner as Reference Example 1 by using the carrier F and a catalyst powder F was obtained. In the catalyst powder F, the volume ratio of a water vapor adsorption amount compared to a nitrogen adsorption amount at a relative pressure of 0.5 in adsorption isotherm was 0.15.

Experiment 1: Evaluation of Platinum Coating

For a case in which platinum is supported, in an amount of 50% by weight relative to carrier weight, on the carriers B and C which have been prepared in Reference Examples 2 and 3 and the carrier F which has been prepared in Reference Example 6, the platinum specific surface area (COMSA) was measured by CO adsorption method. The results are shown in FIG. 4.

Based on FIG. 4, it is found that the carriers B and C (carbon powder) with a BET specific surface area of at least 900 $m^2/g$ have a significantly higher platinum specific surface area compared to the carrier F with a BET specific surface area of less than 900 $m^2/g$. Since the BET specific surface area of a catalyst is similar to the BET specific surface area of a carrier, it is believed that the electric double layer capacity of a carrier can be significantly improved as the BET specific surface area of a catalyst is 900 $m^2/g$ or more.

Experiment 2: Evaluation of Durability

The catalyst powders A to E were used for durability evaluation as described below. The results are shown in Table 3 below. Namely, a three-electrode type electrochemical cell was used, and as a potentiostat, the electrochemical measuring system HZ-5000+HR301 manufactured by HOKUTO DENKO CORP. was used. As a working electrode, a glassy carbon rotating electrode (GC-RDE) (ϕ(diameter)=5 mm) was used. Then, after coating with an ink, which has been obtained by dispersing each catalyst powder prepared in Reference Example, dispersed in a mixed solvent of water and 1-propanol as a dispersion medium to have dry film thickness of 1 μm followed by drying, the resulting electrode was used. As a counter electrode, carbon was used. As a reference electrode, a reversible hydrogen electrode (RHE) was used. As an electrolyte liquid, 0.1 M perchloric acid saturated with $O_2$ was used. The measurement was performed at 60° C. Calculation of an effective surface area of catalyst (ECA) was performed by cyclic voltammetry (CV). Before performing the measurement, potential injection was performed for 30 seconds at potential of 1.0 V. After that, the potential range of from 1.0 to 1.5 V was increased (1 second) and then decreased (1 second) at potential sweep rate of 0.5 V/s, and this operation was employed as one cycle (2 seconds/cycle). As a result of repeating this potential cycle, the peak potential of quinone-hydroquinone cathodic current around 0.6 V measured by cyclic voltammetry is shifted to a lower voltage side, in accordance with increasing potential cycle. From the change in this cathodic current, the carbon state and a change in electric double layer capacity were approximately obtained. Specifically, the number of cycles that can be performed until the potential of cathodic current is 0.5 V or less is determined as an indicator of durability.

TABLE 3

| | Catalyst powder | R' value | R value | Number of cycles to have peak potential of 0.5 V or less for cathodic current |
| --- | --- | --- | --- | --- |
| Reference Example 1 | A | 0.35 | 2.15 | 4159 |
| Reference Example 2 | B | 0.42 | 1.99 | 3766 |
| Reference Example 3 | C | 0.50 | 1.81 | 1724 |
| Reference Example 4 | D | 0.61 | 1.64 | 1350 |
| Reference Example 5 | E | 0.66 | 1.75 | 778 |

It can be seen from Table 3 that the catalyst powder A to C of Reference Examples 1 to 3 have, compared to the catalyst powder D and E of Reference Examples 4 and 5, large number of cycles for having lowered cathodic current. Based on this, it is considered that a catalyst with R' (D'/G intensity ratio) of 0.6 or less has a small decrease in electric double layer capacity, and thus it can maintain the activity at significantly high level (durability is excellent).

Example 1

The catalyst powder A prepared in Reference Example 1 was subjected to a treatment with an oxidative solution for adding an acidic group. The catalyst powder A was immersed for 2 hours at 80° C. in 3.0 mol/L aqueous solution of nitric acid. After that, it was filtered and dried to obtain the catalyst powder A' (catalyst) having an acidic group.

Furthermore, as for the catalyst powder A', pore volumes of micropores and mesopores, mode diameters of micropores and mesopores and BET specific surface area were measured. As a result, the pore volume of micropores was 0.61 cc/g carrier, the pore volume of mesopores was 0.68 cc/g carrier, the mode diameter of micropores was 0.75 nm, the mode diameter of mesopores was 1.2 nm, and the BET specific surface area was 1115 $m^2/g$ for the catalyst powder A'. Also, the BET specific surface area of the carrier in the catalyst powder A' is 1226 $m^2/g$ carrier.

In the catalyst powder A', the volume ratio of a water vapor adsorption amount compared to a nitrogen adsorption amount at a relative pressure of 0.5 in adsorption isotherm was 0.20.

The catalyst powder A' and an ionomer dispersion liquid (perfluorocarbon sulfonic acid-based polymer, Aciplex (registered trademark) SS700, EW=700 g/eq (g/mol), manufactured by Asahi Kasei Corporation) as a polymer electrolyte were mixed so that the weight ratio of the polymer electrolyte to the carbon carrier was 0.6. Furthermore, a solvent containing water and n-propyl alcohol (weight ratio of 8:2) was added such that the solid content ratio (Pt+carbon carrier+polymer electrolyte) is 7% by weight to prepare a cathode catalyst ink.

Separately, ketjen black EC300J (manufactured by Ketjen Black International) was subjected to a heat treatment at 2000 to 3000° C. under argon atmosphere for 5 to 20 hours. Accordingly, graphite ketjen black (particle size: 30 to 60 nm) was prepared as a carrier. By using this carrier, platinum (Pt) with an average particle size of 2.5 nm was supported as a catalytic metal so that the carrying rate was 50% by weight to obtain a catalyst powder. This catalyst powder and an ionomer dispersion liquid (Nafion (registered trademark) D2020, EW=1100 g/eq (g/mol), manufactured by DuPont) as a polymer electrolyte were mixed so that the weight ratio of the polymer electrolyte to the carbon carrier was 0.9. In addition, a solvent containing water and n-propyl alcohol (weight ratio of 5:5) was added thereto such that the solid content ratio (Pt+carbon carrier+ionomer) is 7% by weight to prepare an anode catalyst ink.

Next, a gasket (manufactured by Teijin Dupont, Teonex, film thickness: 25 μm (adhesive layer: 10 μm)) was provided around the both sides of a polymer electrolyte membrane (manufactured by Dupont, NAFION NR211, film thickness: 25 μm). Subsequently, the exposed part of one side of the polymer electrolyte membrane was coated with the cathode catalyst ink in a size of 5 cm×2 cm by spray coating method. The catalyst ink was dried by keeping the stage of spray coating at 60° C. for 1 minute to obtain a cathode catalyst layer which has film thickness (dry film thickness) of 10 μm.

The platinum carrying amount at that time was 0.15 mg/$cm^2$. Then, spray coating on the electrolyte membrane and heat treatment were performed as in the cathode catalyst layer to form an anode catalyst layer which has film thickness (dry film thickness) of 10 μm.

Both sides of the resulting laminated body were sandwiched between gas diffusion layers (24BC, manufactured by SGL CARBON AG) to obtain a membrane electrode assembly (1) (MEA (1)).

Example 2

The membrane electrode assembly (2) (MEA (2)) was obtained in the same manner as Example 1 except that, for producing a cathode catalyst ink, mixing was carried out so that the weight ratio of the polymer electrolyte to the carbon carrier was 0.5.

Comparative Example 1

The membrane electrode assembly (3) (MEA (3)) was obtained in the same manner as Example 1 except that, for producing a cathode catalyst ink, the catalyst powder A was used instead of the catalyst powder A'.

Comparative Example 2

The membrane electrode assembly (4) (MEA (4)) was obtained in the same manner as Example 1 except that the cathode catalyst ink was prepared as described below.

The catalyst powder A and an ionomer dispersion liquid (Nafion (registered trademark) D2020, EW=1100 g/eq (g/mol), manufactured by DuPont)) were mixed so that the weight ratio of the polymer electrolyte to the carbon carrier was 0.9. Furthermore, a solvent containing water and n-propyl alcohol (weight ratio of 6:4) was added such that the solid content ratio (Pt+carbon carrier+polymer electrolyte) is 7% by weight to prepare a cathode catalyst ink.

Comparative Example 3

The carrier G (Black pearls 2000, manufactured by Cabot Corporation) was used and platinum (Pt) with an average particle size of 3.3 nm was supported as a catalytic metal on this carrier A so that the carrying rate was 50% by weight to obtain a catalyst powder G. Namely, 46 g of the carrier G was immersed in 1000 g of a dinitrodiammine platinum nitric acid solution with a platinum concentration of 4.6% by weight (platinum content: 46 g) and the mixture was stirred, then 100 ml of 100% ethanol was added as a reducing agent. This solution was stirred and mixed at the boiling point for 7 hours, and platinum was supported on the carrier G. Then, the mixture was filtered and dried to obtain a catalyst powder with a carrying rate of 50% by weight. Thereafter, the catalyst powder was maintained in a hydrogen atmosphere at a temperature of 900° C. for 1 hour, to obtain a catalyst powder G. As a result of measuring the R' value of this catalyst powder G, it was found to be 0.85. the BET specific surface area was 1076 $m^2/g$ for the catalyst powder G. Also, the BET specific surface area of the carrier in the catalyst powder G is 1290 $m^2/g$ carrier.

In the catalyst powder G, the volume ratio of a water vapor adsorption amount compared to a nitrogen adsorption amount at a relative pressure of 0.5 in adsorption isotherm was 0.40.

The membrane electrode assembly (5) (MEA (5)) was obtained in the same manner as Comparative Example 2 except that, for producing a cathode catalyst ink, the catalyst powder G was used instead of the catalyst powder A.

[Evaluation of Voltage Drop Caused by Oxygen Transport]

Experiment 3: Evaluation of Oxygen Transport Resistance

By using the membrane electrode assemblies (1) and (2) which have been produced in the above Examples 1 to 2 and the membrane electrode assemblies (3) to (5) which have been produced in the above Comparative Examples 1 to 3, an evaluation of oxygen transport resistance was carried out in accordance with the method described in T. Mashio et al., ECS Trans., 11, 529, (2007).

Specifically, the limiting current density (A/cm$^2$) was measured by using diluted oxygen. At that time, from the slope of the limiting current density (A/cm$^2$) relative to the partial pressure of oxygen (kPa), the gas transport resistance (s/m) was calculated. The results are shown in Table 4.

TABLE 4

|  | Catalyst powder | BET specific surface area (m$^2$/g) | R' value (D'/G intensity ratio) | Ratio of water vapor adsorption amount/nitrogen adsorption amount | Oxygen transport resistance (s/m) |
| --- | --- | --- | --- | --- | --- |
| Example 1 | A' | 1226 | 0.35 | 0.20 | 8.7 |
| Example 2 | A' | 1226 | 0.35 | 0.20 | 10.6 |
| Comparative Example 1 | A | 1226 | 0.35 | 0.080 | 17.0 |
| Comparative Example 2 | A | 1226 | 0.35 | 0.080 | 20.2 |
| Comparative Example 3 | G | 1290 | 0.85 | 0.40 | 12.2 |

It can be seen from Table 4 that the MEAs (1) and (2) of Examples 1 and 2 have lower oxygen transport resistance compared to the MEAs (3) to (5) of Comparative Examples 1 to 3. Thus, it is considered that the gas transportability can be improved by using the fuel cell catalyst layer of the present invention.

The present application is based on Japanese Patent Application No. 2014-220579 filed on Oct. 29, 2014, and its enclosure is entirely incorporated herein by reference.

The invention claimed is:

1. An electrode catalyst for fuel cell comprising a catalyst carrier containing carbon as a main component and a catalytic metal supported on the catalyst carrier, wherein
the catalyst carrier has an R' (D'/G intensity ratio) of 0.6 or less, which is a ratio of a D' band peak intensity (D' intensity) measured in a vicinity of 1620 cm$^{-1}$ relative to a G band peak intensity (G intensity) measured in a vicinity of 1580 cm$^{-1}$ by Raman spectroscopy, and
the electrode catalyst has a volume ratio of a water vapor adsorption amount relative to a nitrogen adsorption amount at a relative pressure of 0.5 in adsorption isotherm is 0.15 or more and 0.30 or less.

2. The electrode catalyst for fuel cell according to claim 1, wherein a BET specific surface area of the electrode catalyst is 900 m$^2$/g catalyst or more.

3. An electrode catalyst layer for fuel cell comprising the electrode catalyst for fuel cell according to claim 1, and a polymer electrolyte.

4. The electrode catalyst layer for fuel cell according to claim 3, wherein the polymer electrolyte is a fluorine-based polymer electrolyte.

5. The electrode catalyst layer for fuel cell according to claim 3, wherein the catalytic metal is supported in mesopores with a radius of 1 nm or more, and the catalytic metal inside the mesopores does not contact the electrolyte.

6. A method for producing the electrode catalyst for fuel cell according to claim 1, the method comprising:
supporting a catalytic metal containing platinum on a catalyst carrier precursor to obtain a catalyst powder; and
treating the catalyst powder with an oxidative treatment solution to obtain a catalyst.

7. The method for producing the electrode catalyst for fuel cell according to claim 6, wherein the catalyst carrier precursor has the R' (D'/G intensity ratio) of 0.6 or less, which is the ratio of the D' band peak intensity (D' intensity) measured in the vicinity of 1620 cm$^{-1}$ relative to the G band peak intensity (G intensity) measured in the vicinity of 1580 cm$^{-1}$ by Raman spectroscopy.

8. The method for producing the electrode catalyst for fuel cell according to claim 6, wherein a BET specific surface area of the catalyst carrier precursor is 900 m$^2$/g or more.

9. A membrane electrode assembly for fuel cell comprising the electrode catalyst for fuel cell according to claim 1.

10. A fuel cell comprising the membrane electrode assembly for fuel cell according to claim 9.

11. The electrode catalyst for fuel cell according to claim 1, wherein the catalyst has micropores with a radius of less than 1 nm and mesopores with a radius of 1 nm or more, and the catalytic metal is supported in the mesopores more than in the micropores.

12. The electrode catalyst for fuel cell according to claim 1, wherein the catalyst satisfies one of the following (a) to (d):
(a) the catalyst has pores with a radius of less than 1 nm and pores with a radius of 1 nm or more, a pore volume of the pores with the radius of less than 1 nm is 0.3 cc/g carrier or more, and the catalytic metal is supported inside the pores with the radius of 1 nm or more;
(b) the catalyst has pores with a radius of 1 nm or more and less than 5 nm, a pore volume of the pores is 0.8 cc/g carrier or more, and the catalytic metal has a specific surface area of 60 m$^2$/g carrier or less;
(c) the catalyst has pores with a radius of less than 1 nm and pores with a radius of 1 nm or more, a mode radius of pore distribution in the pores with the radius of less than 1 nm is 0.3 nm or more and less than 1 nm, and the catalytic metal is supported inside the pores with the radius of 1 nm or more; or
(d) a mode radius of pore distribution in pores with a radius of 1 nm or more is 1 nm or more and less than 5 nm, the catalytic metal is supported inside the pores with the radius of 1 nm or more, the mode radius is the same or less than an average particle radius of the catalytic metal, and a pore volume of the pores with the radius of 1 nm or more and less than 5 nm is 0.4 cc/g carrier or more.

13. The electrode catalyst for fuel cell according to claim 1, wherein the catalyst satisfies: (a) the catalyst has pores with a radius of less than 1 nm and pores with a radius of 1 nm or more, a pore volume of the pores with the radius of less than 1 nm is 0.3 cc/g carrier or more, and the catalytic metal is supported inside the pores with the radius of 1 nm or more.

14. The electrode catalyst for fuel cell according to claim 1, wherein the catalyst satisfies: (b) the catalyst has pores with a radius of 1 nm or more and less than 5 nm, a pore volume of the pores is 0.8 cc/g carrier or more, and the catalytic metal has a specific surface area of 60 $m^2$/g carrier or less.

15. The electrode catalyst for fuel cell according to claim 1, wherein the catalyst satisfies: (c) the catalyst has pores with a radius of less than 1 nm and pores with a radius of 1 nm or more, a mode radius of pore distribution in the pores with the radius of less than 1 nm is 0.3 nm or more and less than 1 nm, and the catalytic metal is supported inside the pores with the radius of 1 nm or more.

16. The electrode catalyst for fuel cell according to claim 1, wherein the catalyst satisfies: (d) a mode radius of pore distribution in pores with a radius of 1 nm or more is 1 nm or more and less than 5 nm, the catalytic metal is supported inside the pores with the radius of 1 nm or more, the mode radius is the same or less than an average particle radius of the catalytic metal, and a pore volume of the pores with the radius of 1 nm or more and less than 5 nm is 0.4 cc/g carrier or more.

* * * * *